(12) United States Patent
Aldhaher et al.

(10) Patent No.: US 10,615,709 B2
(45) Date of Patent: Apr. 7, 2020

(54) RECTIFIER FOR WIRELESS POWER TRANSFER

(71) Applicant: Drayson Technologies (Europe) Limited, Oxfordshire (GB)

(72) Inventors: Samer Aldhaher, London (GB); Manuel Pinuela Rangel, London (GB); Paul David Mitcheson, London (GB); David Christopher Yates, London (GB)

(73) Assignee: DRAYSON TECHNOLOGIES (EUROPE) LIMITED, London (GB)

(*) Notice: Subject to any disclaimer, the term of this patent is extended or adjusted under 35 U.S.C. 154(b) by 333 days.

(21) Appl. No.: 15/548,194

(22) PCT Filed: Feb. 2, 2016

(86) PCT No.: PCT/EP2016/052153
§ 371 (c)(1),
(2) Date: Aug. 2, 2017

(87) PCT Pub. No.: WO2016/124576
PCT Pub. Date: Aug. 11, 2016

(65) Prior Publication Data
US 2018/0034381 A1 Feb. 1, 2018

(30) Foreign Application Priority Data
Feb. 4, 2015 (GB) .................................. 1501889.8

(51) Int. Cl.
*H02M 7/06* (2006.01)
*H02J 50/12* (2016.01)

(52) U.S. Cl.
CPC .............. *H02M 7/06* (2013.01); *H02J 50/12* (2016.02)

(58) Field of Classification Search
CPC .... H02M 7/06–106; H02J 5/005; H02J 7/025; H02J 17/00; H04B 5/0037; B60L 53/12–126
See application file for complete search history.

(56) References Cited

U.S. PATENT DOCUMENTS 6,240,318 B1* 5/2001 Phillips .................... A61N 1/08
607/61
2010/0190435 A1* 7/2010 Cook ...................... H02J 5/005
455/41.1
(Continued)

FOREIGN PATENT DOCUMENTS

EP 2797199 A1 10/2014
WO 2013006068 A1 1/2013
(Continued)

OTHER PUBLICATIONS

G. Kkelis, J. Lawson, D. C. Yates, M, Pinuela, P. D. Mitcheson, "Integration of a Class-E low DV/DT rectifier in a wireless power transfer system", May 9, 2014, IEEE, 2014 IEEE Wireless Power Transfer Conference. (Year: 2014).*
(Continued)

*Primary Examiner* — Rexford N Barnie
*Assistant Examiner* — David A Shiao
(74) *Attorney, Agent, or Firm* — Tarolli, Sundheim, Covell & Tummino LLP

(57) ABSTRACT

A rectifier for wireless power transfer is disclosed. The rectifier comprises an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element;
(Continued)

and a rectifying element in parallel with the first capacitance, wherein: the first inductor is in series with the electromagnetic signal receiving element between the electromagnetic signal receiving element and the second tank circuit, the first capacitance is between the second tank circuit and the third capacitance, and the second inductor and the second capacitance are selected such that the resonant frequency of the second tank circuit is an integer multiple, greater than one, of the first frequency.

20 Claims, 21 Drawing Sheets

(56) References Cited

U.S. PATENT DOCUMENTS

| | | | | |
|---|---|---|---|---|
| 2011/0043210 | A1* | 2/2011 | Zimmerling | A61B 5/0031 324/322 |
| 2011/0298296 | A1* | 12/2011 | Hwang | H02J 50/12 307/104 |
| 2013/0015813 | A1 | 1/2013 | Kim et al. | |
| 2013/0300210 | A1* | 11/2013 | Hosotani | H02J 5/005 307/104 |
| 2013/0343106 | A1* | 12/2013 | Perreault | H03H 7/38 363/67 |
| 2015/0326142 | A1* | 11/2015 | Petras | H02J 50/80 307/104 |
| 2016/0056639 | A1* | 2/2016 | Mao | H02J 50/80 307/104 |
| 2017/0005532 | A1* | 1/2017 | Akuzawa | H02J 17/00 |

FOREIGN PATENT DOCUMENTS

| | | |
|---|---|---|
| WO | 2014061490 A1 | 4/2014 |
| WO | 2014191760 A1 | 12/2014 |
| WO | 2015097801 A1 | 7/2015 |

OTHER PUBLICATIONS

A. Ivascu, M. K. Kaximierczuk, S. Birca-Galateanu, "Class E Resonant Low dv/dt Rectifier", Aug. 1992, IEEE, IEEE Transactions on circuits and systems—I: fundamental theory and applications, vol. 39, No. 8. (Year: 1992).*

W.A. Nitz, W.C. Bowman, F.T. Dickens, F.M. Magalhaes, W. Strauss, W.B. Suiter, N.G. Ziesse, "A new family of resonant rectifier circuits for high frequency DC-DC converter applications", Feb. 5, 1988, IEEE, APEC '88 Third Annual IEEE Applied Power Electronics Conference and Exposition. (Year: 1988).*

GB Search Report dated Sep. 3, 2015 for corresponding Application No. GB1501889.8.

International Search Report dated Apr. 29, 2016 for corresponding Application No. PCT/EP2016/052153.

* cited by examiner

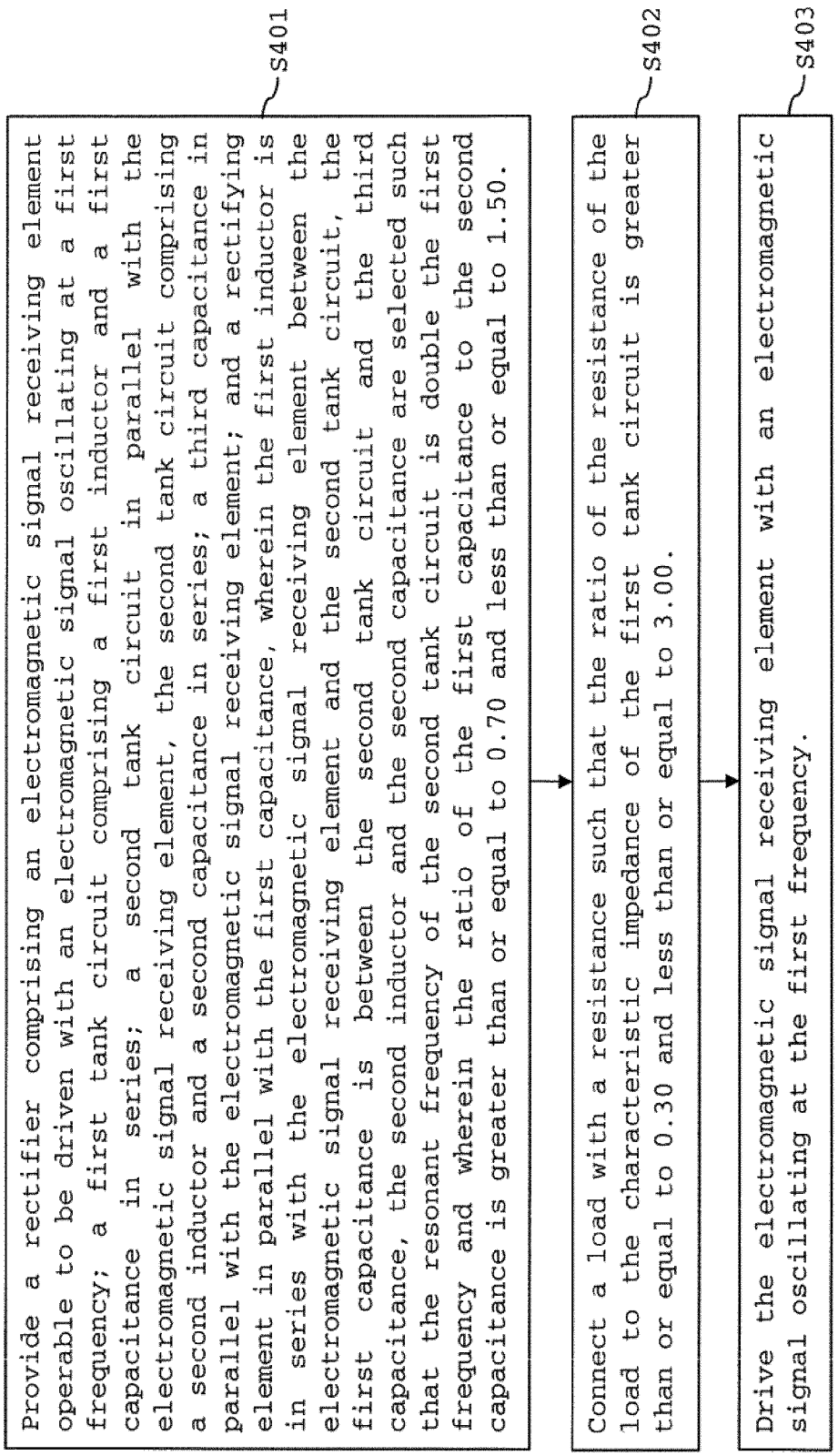

S401: Provide a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.70 and less than or equal to 1.50.

S402: Connect a load with a resistance such that the ratio of the resistance of the load to the characteristic impedance of the first tank circuit is greater than or equal to 0.30 and less than or equal to 3.00.

S403: Drive the electromagnetic signal receiving element with an electromagnetic signal oscillating at the first frequency.

Fig. 4

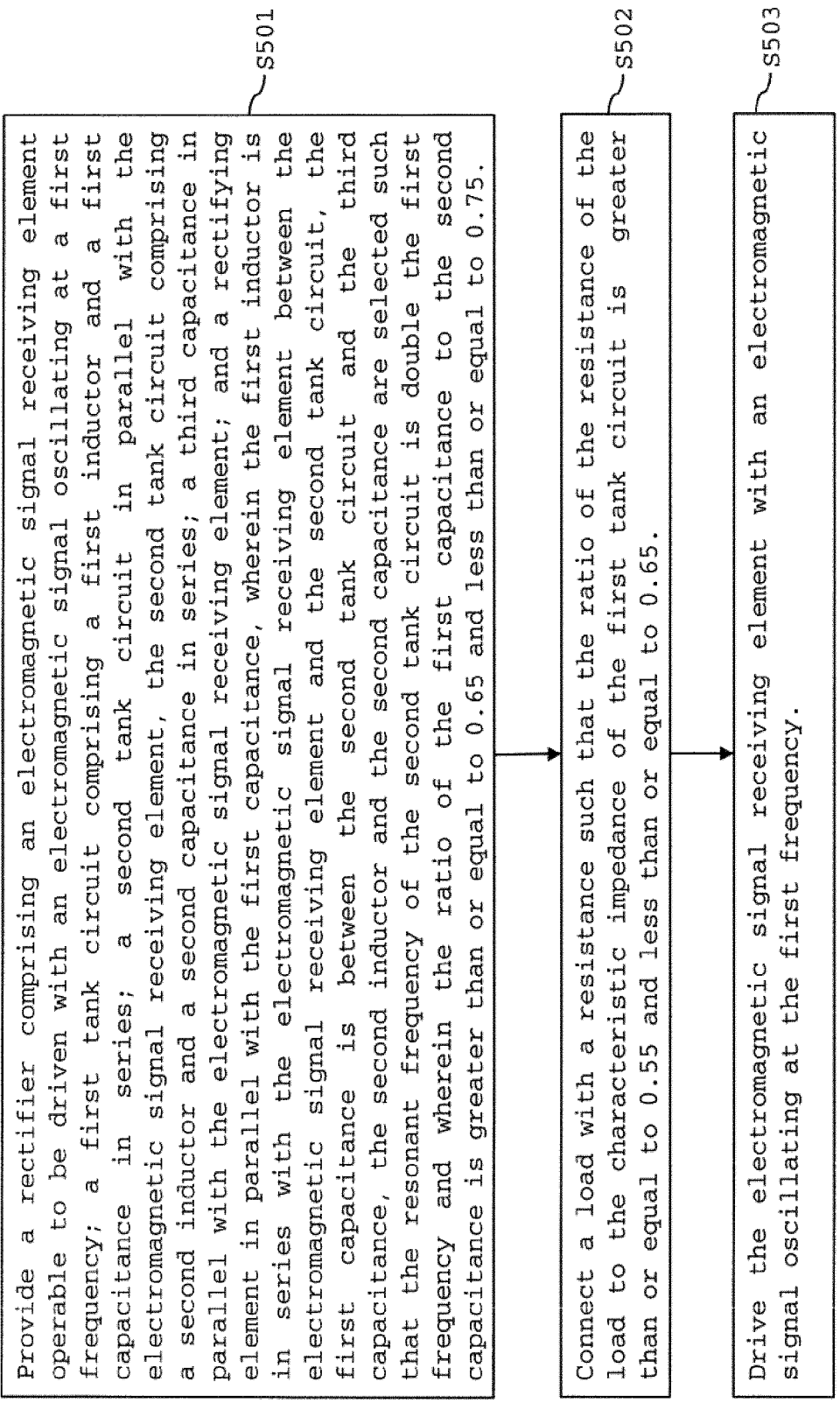

S501: Provide a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.65 and less than or equal to 0.75.

S502: Connect a load with a resistance such that the ratio of the resistance of the load to the characteristic impedance of the first tank circuit is greater than or equal to 0.55 and less than or equal to 0.65.

S503: Drive the electromagnetic signal receiving element with an electromagnetic signal oscillating at the first frequency.

Fig. 5

RECTIFIER FOR WIRELESS POWER TRANSFER

TECHNICAL FIELD

The present invention relates generally to the field of wireless power transfer and more specifically to a rectifier for use in wireless power transfer applications.

BACKGROUND

Wireless power transfer is a well-known type of power transfer permitting the transmission of electrical power from a power source to a consuming power device without using conductors. Wireless power transfer can comprise, for example, inductive power transfer in which time-varying electromagnetic fields are typically transmitted across an air gap to the consuming device. The power is transferred through induction which relies on a magnetic field generated in a transmitter (or primary coil) by an electric current to induce a current in a receiver (or secondary coil). This is the action employed in, for example, a transformer where the primary coil and secondary coil are not connected.

Wireless power transfer also comprises energy harvesting to convert ambient energy from the environment to electric power. The ambient energy may come from stray electric or magnetic fields or radio waves from nearby electrical equipment.

In all forms of wireless power transfer, there is a need for an improved rectifier. For example, in inductive power transfer applications where the primary and secondary coils are not in close proximity and therefore do not have a high coupling factor, there is a need for more efficient, powerful and/or high frequency resonant rectifiers.

SUMMARY

According to the present invention there is provided a rectifier for wireless power transfer, the rectifier comprising: an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein: the first inductor is in series with the electromagnetic signal receiving element between the electromagnetic signal receiving element and the second tank circuit, the first capacitance is between the second tank circuit and the third capacitance, and the second inductor and the second capacitance are selected such that the resonant frequency of the second tank circuit is an integer multiple, greater than one, of the first frequency.

The present invention also provides a wireless power transfer receiver comprising: a rectifier as defined above; and a load connected in parallel with the electromagnetic signal receiving element.

The present invention also provides a wireless power transfer system comprising: a wireless power transfer transmitter comprising an electromagnetic signal transmitting element; and a wireless power transfer receiver as defined above.

The present invention also provides a method for wireless power transfer, comprising: providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.70 and less than or equal to 1.50; connecting a load with a resistance such that the ratio of the resistance of the load to the characteristic impedance of the first tank circuit is greater than or equal to 0.30 and less than or equal to 3.00;

and driving the electromagnetic signal receiving element with an electromagnetic signal oscillating at the first frequency.

The present invention also provides a method for wireless power transfer, comprising: providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.65 and less than or equal to 0.75; connecting a load with a resistance such that the ratio of the resistance of the load to the characteristic impedance of the first tank circuit is greater than or equal to 0.55 and less than or equal to 0.65; and driving the electromagnetic signal receiving element with an electromagnetic signal oscillating at the first frequency.

The present invention also provides a method for wireless power transfer, comprising: providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 20;

connecting a load; and driving the electromagnetic signal receiving element with an electromagnetic signal oscillating at the first frequency.

LIST OF FIGURES

Embodiments of the present invention will now be described, by way of example only, with reference to the accompanying drawings, in which like reference numbers are used for like elements, and in which:

FIG. 1 schematically illustrates a wireless power transfer receiver comprising a load and a rectifier according to an embodiment of the present invention;

FIG. 4 depicts a first method of operating a rectifier;

FIG. 5 depicts a second method of operating a rectifier;

DETAILED DESCRIPTION OF EMBODIMENTS

Although embodiments of the invention will be described below with reference to inductive power transfer, the embodiments are equally applicable to other forms of wireless power transfer, such as energy harvesting.

At present, rectifiers for inductive power transfer are based on either a half-wave or bridge type rectifier. These rectifiers have a non-sinusoidal input current and therefore do not reflect a linear load to the wireless link and to the primary coil of an inverter. As a result, the primary coil inverter will not operate at its optimum conditions, which could then have a significant impact on the system's overall performance and efficiency.

Class E type rectifiers consist of a single rectifying element (usually a diode). However, they suffer from the drawback that the peak voltage developed across the rectifying element can be anywhere between two to ten times the output rectified DC voltage. This high voltage stress narrows the choice of rectifying element that can be used. Furthermore, a high voltage rectifying element has a higher forward voltage which causes increased conduction losses, and has a high output capacitance which limits the frequency that it can operate at.

The present inventors have devised a new rectifier which, inter alia, can reduce the peak voltage across the rectifying element by as much as 50%.

Figure 1:
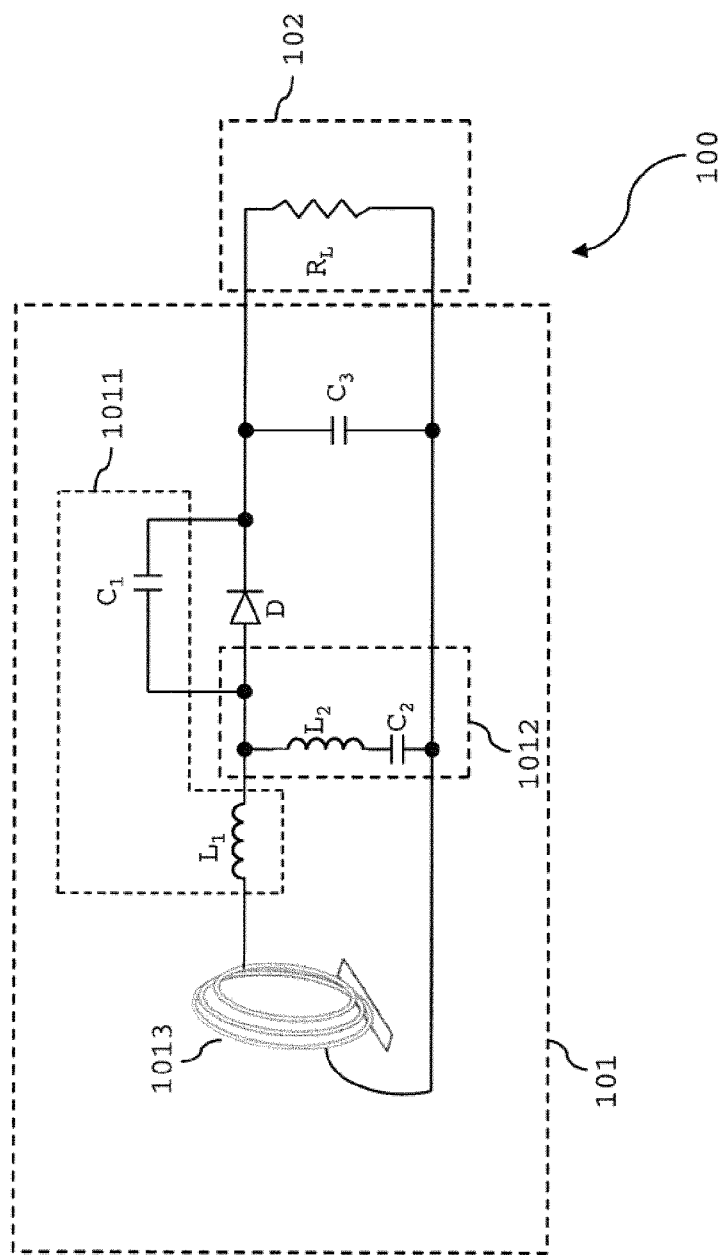

One embodiment of the new rectifier 101 is depicted in FIG. 1, which schematically shows a rectifier 101 connected to a load 102 to form a wireless power transfer receiver 100. The load 102 is depicted as a resistance $R_L$. The rectifier 101 comprises a rectifying element D, which, in this embodiment, is a diode, although other types of rectifying element D can be employed instead. In this embodiment, the diode D is a Schottky diode, although other types of diode can be employed instead. As will be explained below, the rectifier 101 has features which reduce the peak voltage across the rectifying element D.

The rectifier 101 comprises an electromagnetic signal receiving element 1013 which, because this embodiment is designed for inductive power transfer, comprises a receiver coil 1013 operable to be driven with an electromagnetic signal oscillating at a first frequency $f_s$, which may be a predefined frequency.

The rectifier 101 also comprises a first tank circuit 1011 comprising a first inductor $L_1$ and a first capacitance $C_1$ in series. The first capacitance $C_1$ is arranged in parallel with the rectifying element D.

A second tank circuit 1012 is arranged in parallel with the electromagnetic signal receiving element 1013, the second tank circuit 1012 comprising a second inductor $L_2$ and a second capacitance $C_2$ in series. The second inductor $L_2$ and the second capacitance $C_2$ are selected such that the resonant frequency of the second tank circuit 1012 is an integer multiple, greater than one, of the first frequency $f_s$.

The rectifier 101 is therefore a hybrid rectifier which can be referred to as a Class $EF_n$ or Class $E/F_n$ rectifier. The subscript n refers to the ratio of the resonant frequency of the second tank circuit 1012 to the first frequency $f_s$ of the rectifier 101 and is an integer number greater than or equal to 2. The $EF_n$ term is used if n is an even integer and the $E/F_n$ term is used if n is an odd integer.

As will be explained in more detail below, the resonant frequency of the second tank circuit 1012 need not be precisely an integer multiple (greater than one) of the first frequency $f_s$ to achieve the advantages described herein, but instead can be equal to the integer multiple ±0.05. Accordingly, when any of the terms "integer multiple", "twice", "double", etc. or the like are used herein to refer to the relationship between the resonant frequency of the second tank circuit 1012 and the first frequency $f_s$, these terms should be understood to encompass the ±0.05 tolerance.

A third capacitance $C_3$ is arranged in parallel with the electromagnetic signal receiving element 1013. The third capacitance $C_3$ operates as a filter capacitor and may be selected such that the output voltage of the rectifier 101 is DC and ripple free.

The first inductor $L_1$ is arranged in series with the electromagnetic signal receiving element 1013 between the electromagnetic signal receiving element 1013 and the second tank circuit 1012. The first capacitance $C_1$ is arranged in series with the first inductor $L_1$ between the second tank circuit 1012 and the third capacitance $C_3$.

The overall effect of the rectifier 101 is to reduce the voltage developed across the rectifying element D. The rectifier 101 depicted in FIG. 1 may improve upon the performance of existing rectifiers in a number of ways:

1. The peak voltage developed across the rectifying element D is reduced by up to 50%. p1 2. The rectifying element D's conduction angle (i.e. the time it is ON) is reduced. Therefore the conduction losses are reduced, which improves the overall efficiency.
3. This rectifier 101 allows for diodes with lower reverse blocking voltages to be used. Diodes with lower reverse voltage ratings generally have lower forward voltage drops, and therefore the conduction losses are reduced and the overall efficiency is increased. Diodes with lower reverse voltage ratings also generally have lower output capacitances which means the rectifier 101 of an embodiment of the present invention could operate at higher frequencies.
4. The maximum peak voltage across the rectifying element D equals the peak input AC voltage when the load 102 is suddenly disconnected or if the rectifier 101 is powered without a load, whereas the peak voltage across the rectifying element in existing rectifiers is equal to twice or more of the input AC voltage. As a result, the rectifier of an embodiment of the present invention requires a smaller safety margin for the peak reverse voltage of the rectifying element D.
5. The input current is closer to an ideal sinusoidal waveform.

The rectifier 101 shown in FIG. 1 may be modified in a number of different ways.

Figure 2:
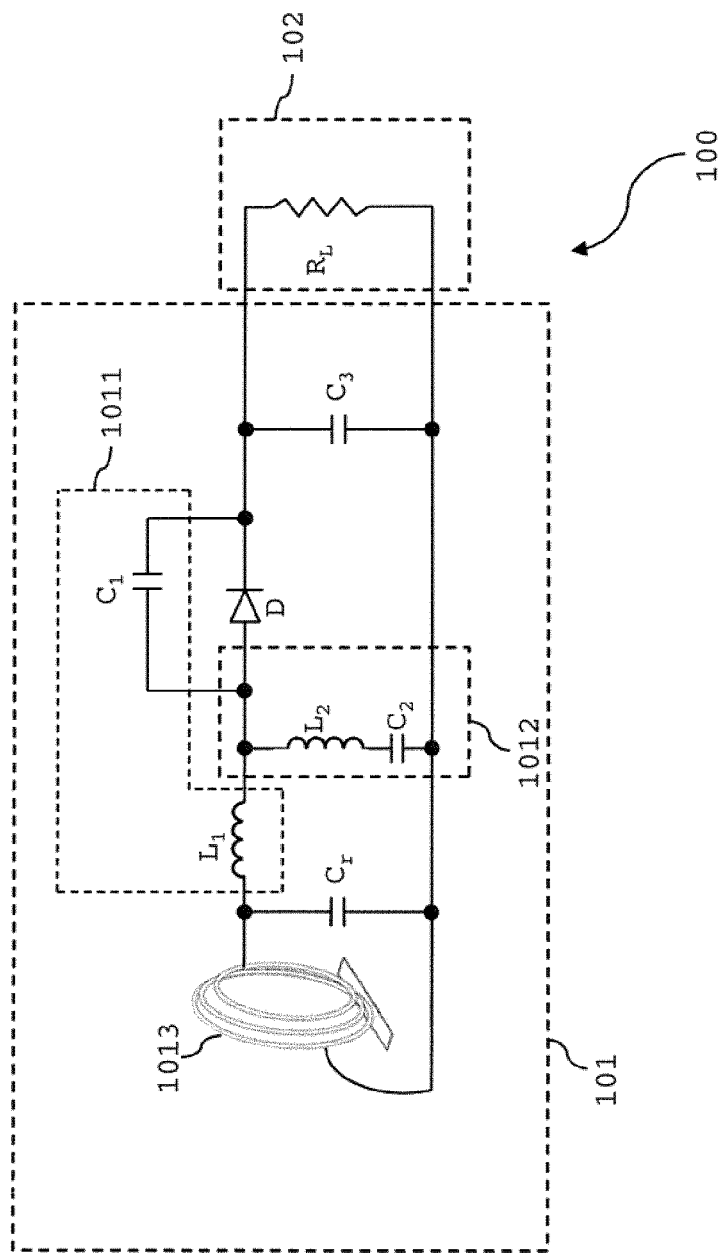
FIG. 2 depicts a modification to the rectifier disclosed in FIG. 1 with the addition of a fourth capacitance.

For example, FIG. 2 depicts a modification to the rectifier 101 in which a fourth capacitance $C_r$ is provided in parallel with the electromagnetic signal receiving element 1013. The electromagnetic signal receiving element 1013 can be modelled as an inductance $L_r$ (not shown) representing the electromagnetic signal receiving element 1013 in this embodiment. The inventors have found that including the parallel capacitance $C_r$ increases the power efficiency of the rectifier 101 by increasing the load resistance seen by the inverter due to the reduction in the reactance of the electromagnetic signal receiving element 1013.

The value of $C_r$ may be chosen such that the resonant frequency of $L_r$ and $C_r$ is equal to the frequency of the wireless power transfer system, namely the first frequency $f_s$.

Alternatively, the value of $C_r$ may be chosen such that the resonant frequency of $L_r$ and $C_r$ differs from the frequency of the wireless power transfer system, namely the first frequency $f_s$. The present inventors found this to be advantageous because the electromagnetic signal receiving element 1013 and capacitor $C_r$ thereby operate in semi-resonance and maintain some reactive impedance. In particular, the present inventors have found that the ratio of the first frequency $f_s$ to the resonant frequency of the electromagnetic signal receiving element 1013 and capacitor $C_r$ should be in the range of 0.2 to 3.0. This range allows the tuning of the rectifier 101 for a desired output voltage and efficiency across different input voltages and electromagnetic signal receiving element 1013 inductances.

Figure 3:
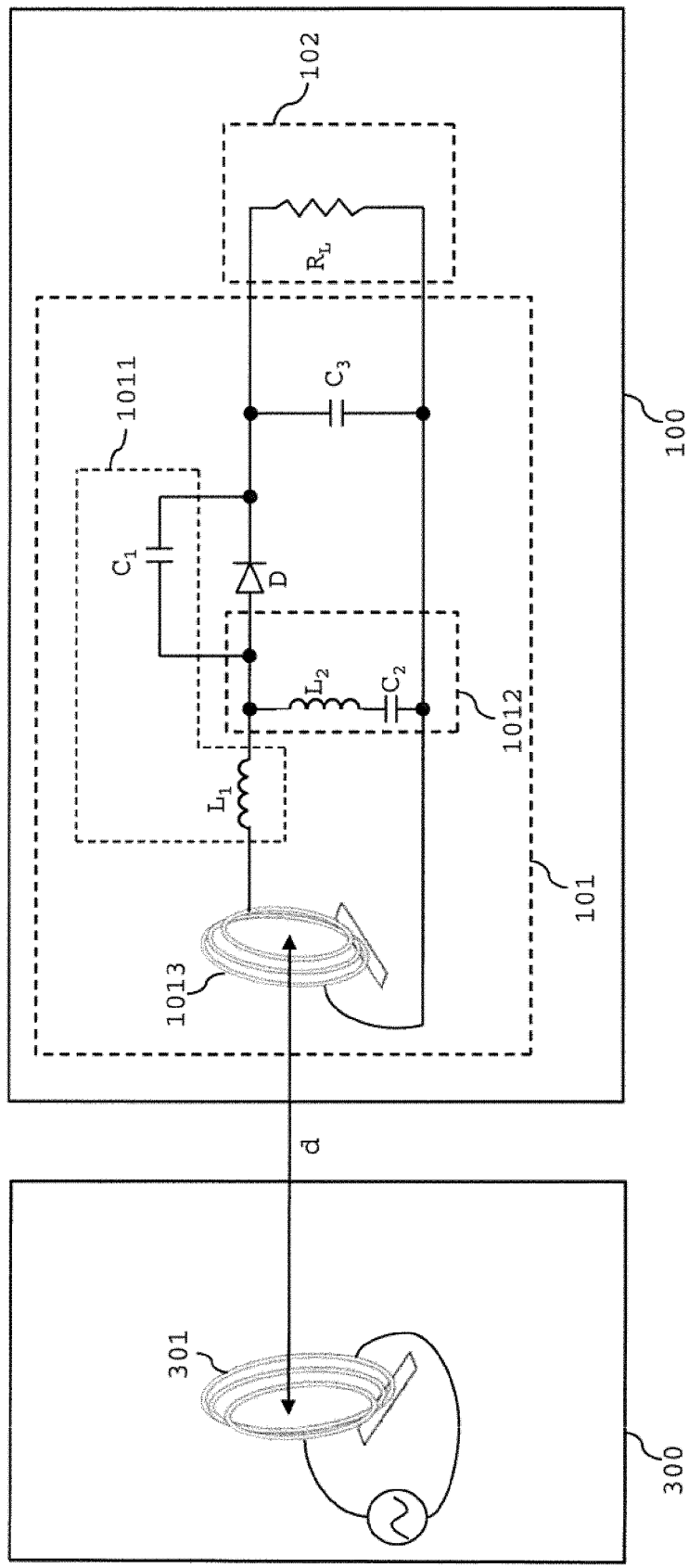
FIG. 3 is a diagram of a wireless power transfer system.

FIG. 3 depicts a wireless power transfer system which, in the embodiment, is a system of inductive power transfer. The wireless power transfer system comprises a wireless power transfer receiver 100, as described previously, together with a wireless power transfer transmitter 300 to drive the receiver coil 1013 of the inverter 101 at the first frequency $f_s$. In this embodiment, the wireless power transfer transmitter 300 is operable to drive the receiver coil 1013 at a frequency of over 6 MHz. The wireless power transfer transmitter 300 comprises a transmitter coil 301 spaced apart from the receiver coil 1013 of the wireless power transfer receiver 100. The centres of the transmitter coil 301 and receiver coil 1013 are spaced apart by a distance d. Although the diagram depicts the coils as angled relative to each other, this need not be the case and the coils are typically parallel to each other or may take any orientation with respect to each other. The wireless power transfer transmitter 300 transmits power via electromagnetic radiation to the receiver coil 1013 which is driven by the electromagnetic radiation to induce a current in the wireless power transfer receiver 100.

As noted above, the second tank circuit 1012 in embodiments of the present invention may be tuned to any integer multiple of the first frequency $f_s$, where the integer multiple is 2 or greater.

As will be explained in more detail below, the present inventors have investigated how to optimise the rectifier 101 with the second tank circuit 1012 tuned to twice the first frequency $f_s$ to achieve high output power capability and/or operation equivalent to a Class E type rectifier. As a result of these investigations, the present inventors have found that, by selecting the capacitances $C_1$ and $C_2$, the characteristic impedance of the first tank circuit 1011 and the load resistance $R_L$, the wireless power transfer receiver 100 can be optimised for high output power capability and/or operation equivalent to a Class E type rectifier.

More particularly, for maximum output power capability in a receiver 100 in which the second tank circuit 1012 of the rectifier 101 is tuned to twice the first frequency $f_s$, the inventors have found that capacitances $C_1$ and $C_2$ should be selected such that the ratio of $C_1$ to $C_2$ is 0.967 or, taking into account tolerances, between 0.9 and 1.0, and the ratio of the resistance of the load $R_L$ to the characteristic impedance of the first tank circuit 1011 should be 0.840 or, taking into account tolerances, between 0.8 and 0.9. The characteristic impedance of the first tank circuit 1011 is defined as the square root of the ratio of the inductance of the first inductor $L_1$ to the first capacitance $C_1$.

To achieve 90% or greater of the maximum power, the inventors have found that capacitances $C_1$ and $C_2$ should be selected such that the ratio of $C_1$ to $C_2$ is between 0.75 and 1.50, and the load 102 should be selected such that the ratio of the resistance of the load $R_L$ to the characteristic impedance of the first tank circuit 1011 is between 0.35 and 1.25.

To achieve 80% or greater of the maximum power, the inventors have found that capacitances $C_1$ and $C_2$ should be selected such that the ratio of $C_1$ to $C_2$ is between 0.75 and 1.50, and the load 102 should be selected such that the ratio of the resistance of the load $R_L$ to the characteristic impedance of the first tank circuit 1011 is between 0.30 and 3.00.

Accordingly, a method for wireless power transfer in an embodiment is shown in FIG. 4. Referring to FIG. 4, at step S401 a rectifier 101 is provided comprising an electromagnetic signal receiving element 1013 operable to be driven with an electromagnetic signal oscillating at a first frequency $f_s$; a first tank circuit 1011 comprising a first inductor $L_1$ and a first capacitance $C_1$ in series; a second tank circuit 1012 in parallel with the electromagnetic signal receiving element 1013, the second tank circuit 1012 comprising a second inductor $L_2$ and a second capacitance $C_2$ in series; a third capacitance $C_3$ in parallel with the electromagnetic signal receiving element 1013; and a rectifying element D in parallel with the first capacitance $C_1$, wherein the first inductor $L_1$ is in series with the electromagnetic signal receiving element 1013 between the electromagnetic signal receiving element 1013 and the second tank circuit 1012, the first capacitance $C_1$ is between the second tank circuit 1012 and the third capacitance $C_3$, the second inductor $L_2$ and the second capacitance $C_2$ are selected such that the resonant frequency of the second tank circuit 1012 is double the first frequency $f_s$ and wherein the ratio of the first capacitance $C_1$ to the second capacitance $C_2$ is greater than or equal to 0.70 and less than or equal to 1.50.

At step S402, a load 102 is connected with a resistance $R_L$ such that the ratio of the resistance $R_L$ of the load 102 to the characteristic impedance of the first tank circuit 1011 is greater than or equal to 0.30 and less than or equal to 3.00.

At step S403 the electromagnetic signal receiving element 1013 is driven with an electromagnetic signal oscillating at the first frequency $f_s$.

For operation equivalent to a Class E type rectifier, the inventors have found that, in a receiver 100 in which the second tank circuit 1012 of the rectifier 101 is tuned to twice the first frequency $f_s$, the capacitances $C_1$ and $C_2$ should be selected such that the ratio of $C_1$ to $C_2$ is 0.7 or, taking into account tolerances between 0.65 and 0.75. The ratio of the resistance of the load $R_L$ to the characteristic impedance of the first tank circuit 1011 should be 0.6 or, taking into account tolerances between 0.55 and 0.65.

Accordingly, a method for wireless power transfer in an embodiment is shown in FIG. 5. Referring to FIG. 5, at step S501 a rectifier 101 is provided comprising an electromagnetic signal receiving element 1013 operable to be driven with an electromagnetic signal oscillating at a first frequency $f_s$; a first tank circuit 1011 comprising a first inductor $L_1$ and a first capacitance $C_1$ in series; a second tank circuit 1012 in parallel with the electromagnetic signal receiving element 1013, the second tank circuit 1012 comprising a second inductor $L_2$ and a second capacitance $C_2$ in series; a third capacitance $C_3$ in parallel with the electromagnetic signal receiving element 1013; and a rectifying element D in parallel with the first capacitance $C_1$, wherein the first inductor $L_1$ is in series with the electromagnetic signal receiving element 1013 between the electromagnetic signal receiving element 1013 and the second tank circuit 1012, the first capacitance $C_1$ is between the second tank circuit 1012 and the third capacitance $C_3$, the second inductor $L_2$ and the second capacitance $C_2$ are selected such that the resonant frequency of the second tank circuit 1012 is double the first frequency $f_s$ and wherein the ratio of the first capacitance $C_1$ to the second capacitance $C_2$ is greater than or equal to 0.65 and less than or equal to 0.75.

At step S502, a load 102 is connected with a resistance $R_L$ such that the ratio of the resistance $R_L$ of the load 102 to the characteristic impedance of the first tank circuit 1011 is greater than or equal to 0.55 and less than or equal to 0.65.

At step S503 the electromagnetic signal receiving element 1013 is driven with an electromagnetic signal oscillating at the first frequency $f_s$.

For a steady state in a receiver 100 in which the second tank circuit 1012 of the rectifier 101 is tuned to twice the first frequency $f_s$, the inventors have found that capacitances $C_1$ and $C_2$ should be selected such that the ratio of $C_1$ to $C_2$ is greater than or equal to 20.

Figure 6:
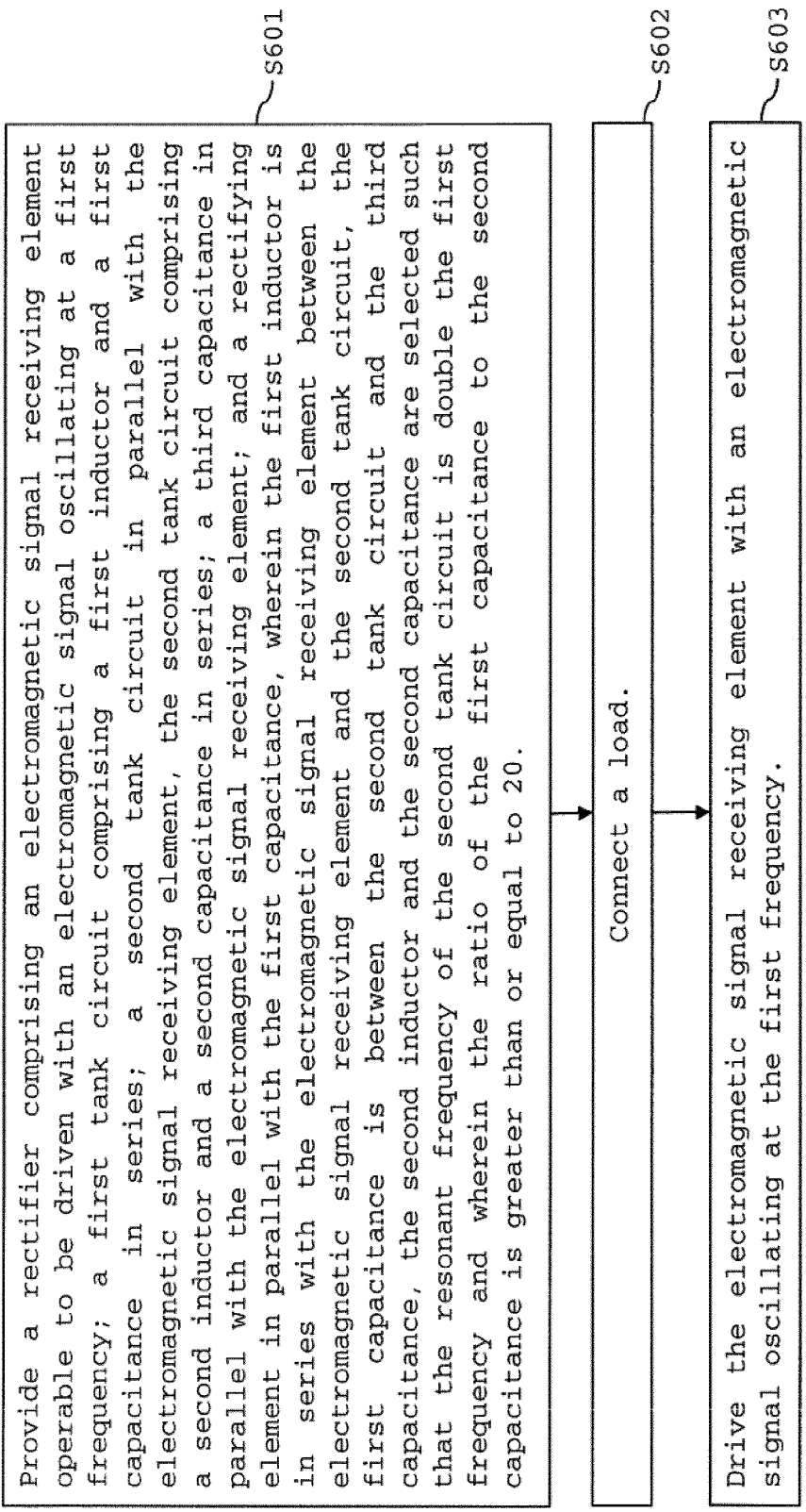
FIG. 6 depicts a third method of operating a rectifier.

Accordingly, a method for wireless power transfer in an embodiment is shown in FIG. 6. Referring to FIG. 6, at step S601 a rectifier 101 is provided comprising an electromagnetic signal receiving element 1013 operable to be driven with an electromagnetic signal oscillating at a first frequency $f_s$; a first tank circuit 1011 comprising a first inductor $L_1$ and a first capacitance $C_1$ in series; a second tank circuit 1012 in parallel with the electromagnetic signal receiving element 1013, the second tank circuit 1012 comprising a second inductor $L_2$ and a second capacitance $C_2$ in series; a third capacitance $C_3$ in parallel with the electromagnetic signal receiving element 1013; and a rectifying element D in parallel with the first capacitance $C_1$, wherein the first inductor $L_1$ is in series with the electromagnetic signal receiving element 1013 between the electromagnetic signal receiving element 1013 and the second tank circuit 1012, the first capacitance $C_1$ is between the second tank circuit 1012 and the third capacitance $C_3$, the second inductor $L_2$ and the second capacitance $C_2$ are selected such that the resonant frequency of the second tank circuit 1012 is double the first frequency $f_s$ and wherein the ratio of the first capacitance $C_1$ to the second capacitance $C_2$ is greater than or equal to 20.

At step S602, load 102 is connected.

At step S603 the electromagnetic signal receiving element 1013 is driven with an electromagnetic signal oscillating at the first frequency $f_s$.

The advantages set out above, and those described below, can still be achieved even when the resonant frequency of the second tank circuit 1012 is not precisely an integer multiple, greater than one, of the first frequency $f_s$. More particularly, the present inventors have found that the integer multiple with a tolerance of ±0.05 is sufficient to ensure correct operation. By way of example, when the resonant frequency of the second tank circuit 1012 is to be tuned to twice the first frequency $f_s$, then correct operation can be achieved when the resonant frequency of the second tank circuit 1012 is between 1.95 and 2.05 times the first frequency $f_s$. Similarly, when the resonant frequency of the second tank circuit 1012 is to be tuned to three times the first frequency $f_s$, correct operation can be achieved when the resonant frequency of the second tank circuit 1012 is between 2.95 and 3.05 times the first frequency $f_s$. The ±0.05 tolerances also apply to all integers higher than 3.

The following analysis provides further details of the above-described rectifier 101 and its properties. The analysis considers the rectifier 101 operating in an inductive power transfer system. However, without loss of generality, the analysis can be applied to other forms of wireless power transfer, such as energy harvesting. The analysis was performed using state space modelling with Matlab, and is based on the following assumptions:

1. The rectifying element D is a diode;
2. The first tank circuit 1011 has a resonant frequency equal to the frequency of the input voltage, i.e. the first frequency $f_s$; and
3. The second tank circuit has a resonant frequency equal to twice the frequency of the input voltage, i.e. twice the first frequency $f_s$.

The input voltage $V_{IN}$, received from the electromagnetic signal receiving element 1013, can be represented as an induced AC voltage which is sinusoidal and represented by $$V_{IN}(\omega t) = v_m \sin(\omega t + \phi). \tag{1}$$

The resonant frequency of $L_1$ and $C_1$ is equal to the frequency of the input voltage given as $$\omega = \frac{1}{\sqrt{L_1 C_1}}. \tag{2}$$

The characteristic impedance of the resonant circuit is $$Z = \omega L_1 = \frac{1}{\omega C_1} = \sqrt{\frac{L_1}{C_1}} \tag{3}$$

and the normalised load is $$R_{norm} = \frac{R_L}{Z}. \quad (4)$$

The resonant frequency of $L_2$ and $C_2$ is equal to twice the frequency of the input voltage given as $$2\omega = \frac{1}{\sqrt{L_2 C_2}}. \quad (5)$$

The ratio of capacitor $C_1$ to capacitor $C_2$ can be defined as $$k = \frac{C_1}{C_2}. \quad (6)$$

Figure 7A:
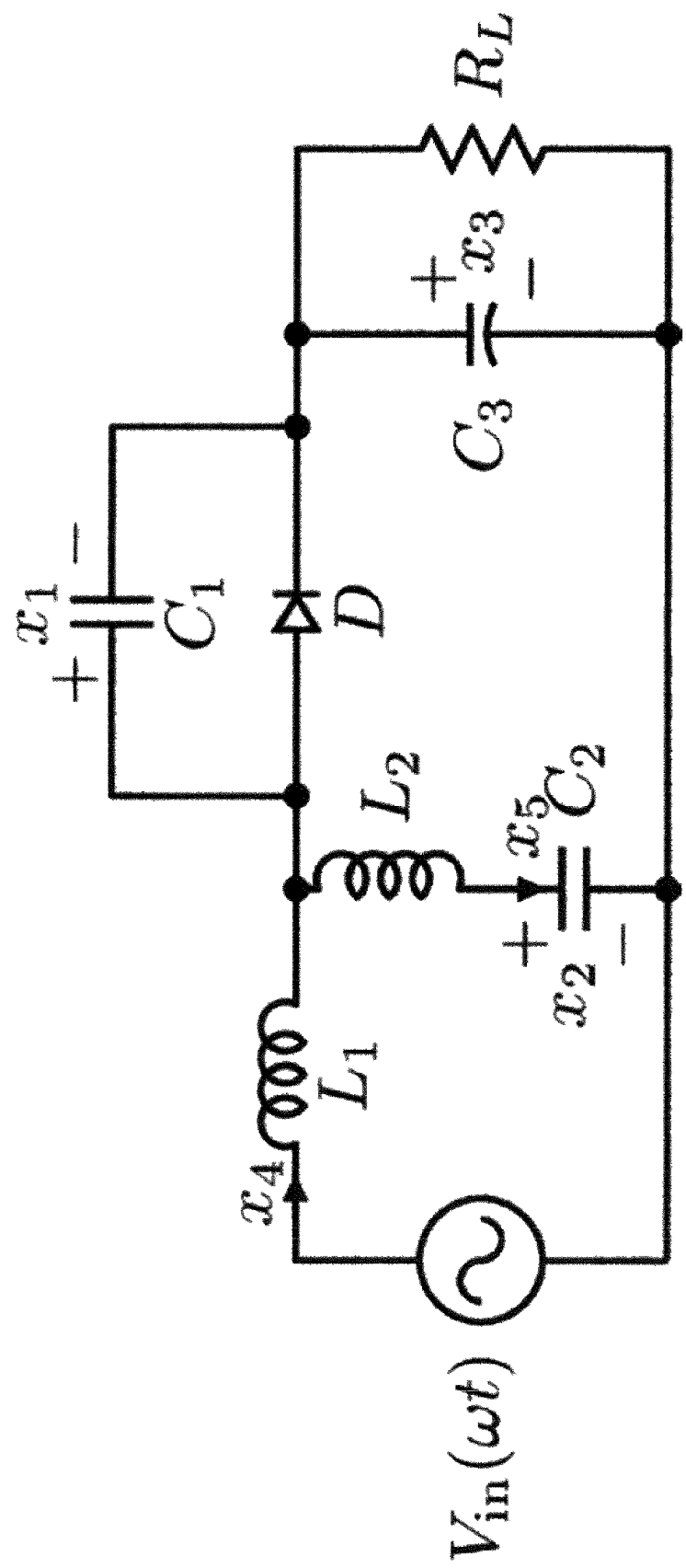
FIGS. 7a and 7b depict a circuit for analysis of special modes of a rectifier.
Figure 7B:
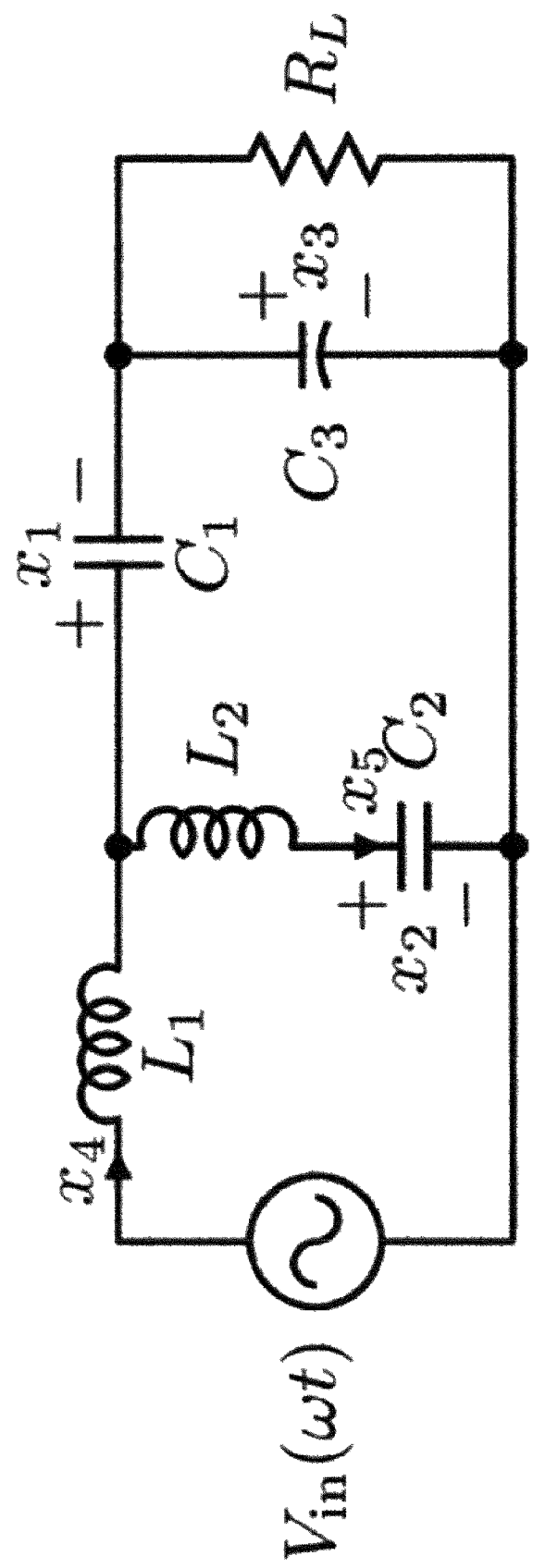

The equivalent circuits shown in FIGS. 7a and 7b correspond to the ON and OFF periods of the rectifying element D, respectively. The piecewise linear model of a diode is used which consists of a voltage source $V_f$, representing the forward voltage drop, and resistance $r_{ON}$, representing the diode's ON resistance.

The equivalent circuits are a piecewise linear multiple input multiple output time invariant system which can be represented by the following state—space representation for each ON and OFF intervals $$\dot{x}(\omega t) = Ax(\omega t) + Bu(\omega t) \quad (7)$$

$$y(\omega t) = Cx(\omega t) + Du(\omega t) \quad (8)$$

where $x(\omega t) = [x_1(\omega t), x_2(\omega t), x_3(\omega t), x_4(\omega t), x_5(\omega t)]^T$ is the state vector. The state variables $x_1, x_2, x_3, x_4, x_5$ represent the voltage across $C_1$, the voltage across $C_2$, the voltage across $C_3$, the current through $L_1$ and the current through $L_2$ for both ON and OFF intervals respectively. The input vector $u(\omega t) = [u_1(\omega t), u_2(\omega t)]^T$ where $u_1$ and $u_2$ represent the input sinusoidal voltage and the forward voltage drop of the diode respectively. The ON interval's domain is defined as $0 \leq \omega t \leq 2\pi D$ and the OFF interval's domain is defined as $0 \leq \omega t \leq 2\pi(1-D)$ where D is the ON duty cycle of the diode.

Using KVL and KCL, the matrices A, B, C and D and the input vectors, denoted by the subscripts ON and OFF for both intervals are given as $$A_{ON} = \begin{bmatrix} -\frac{1}{\omega C_1 r_{ON}} & 0 & 0 & \frac{1}{\omega C_1} & -\frac{1}{\omega C_1} \\ 0 & 0 & 0 & 0 & \frac{1}{\omega C_2} \\ 0 & 0 & -\frac{1}{\omega C_3 R_L} & \frac{1}{\omega C_3} & -\frac{1}{\omega C_3} \\ -\frac{1}{\omega L_1} & 0 & -\frac{1}{\omega L_1} & 0 & 0 \\ \frac{1}{\omega L_2} & -\frac{1}{\omega L_2} & \frac{1}{\omega L_2} & 0 & 0 \end{bmatrix} \quad (9)$$

$$A_{OFF} = \begin{bmatrix} 0 & 0 & 0 & \frac{1}{\omega C_1} & -\frac{1}{\omega C_1} \\ 0 & 0 & 0 & 0 & \frac{1}{\omega C_2} \\ 0 & 0 & -\frac{1}{\omega C_3 R_L} & \frac{1}{\omega C_3} & -\frac{1}{\omega C_3} \\ -\frac{1}{\omega L_1} & 0 & -\frac{1}{\omega L_1} & 0 & 0 \\ \frac{1}{\omega L_2} & -\frac{1}{\omega L_2} & \frac{1}{\omega L_2} & 0 & 0 \end{bmatrix} \quad (10)$$

$$B_{ON} = [B_{1ON} \ B_{2ON}] = \begin{bmatrix} 0 & \frac{1}{\omega r_{ON} C_1} \\ 0 & 0 \\ 0 & 0 \\ \frac{1}{\omega L} & 0 \\ 0 & 0 \end{bmatrix} \quad (11)$$

$$B_{OFF} = [B_{1OFF} \ B_{2OFF}] = \begin{bmatrix} 0 & 0 \\ 0 & 0 \\ 0 & 0 \\ \frac{1}{\omega L} & 0 \\ 0 & 0 \end{bmatrix} \quad (12)$$

$$C_{ON} = C_{OFF} = C = I \quad (13)$$

$$D_{ON} = D_{OFF} = D = \begin{bmatrix} 0 & 0 \\ 0 & 0 \\ 0 & 0 \\ 0 & 0 \\ 0 & 0 \end{bmatrix}^T \quad (14)$$

$$u_{ON}(\omega t) = \begin{bmatrix} u_{1ON}(\omega t) \\ u_{2ON}(\omega t) \end{bmatrix} = \begin{bmatrix} v_m \sin(\omega t + \phi_{ON}) \\ V_f \end{bmatrix} \quad (15)$$

$$u_{OFF}(\omega t) = \begin{bmatrix} u_{1OFF}(\omega t) \\ u_{2OFF}(\omega t) \end{bmatrix} = \begin{bmatrix} v_m \sin(\omega t + \phi_{OFF}) \\ 0 \end{bmatrix} \quad (16)$$

where $v_m$ is the magnitude of the input voltage and $$\phi_{ON} = \phi_0 + 2\pi(1-D) \quad (17)$$

$$\phi_{OFF} = \phi_0. \quad (18)$$

The solution to Equation 7 for both ON and OFF states is $$x(\omega t) = x_n(\omega t) + x_f(\omega t). \quad (19)$$

Function $x_n$ is the natural response, or the zero-input response, and is equal to $$x_n(\omega t) = e^{A\omega t} x(0) \quad (20)$$

where $x(0)$ is the initial condition of the states, e is the matrix exponential function. Function $x_f$ is the forced response, or the zero-state response, and is equal to $$x_f(\omega t) = \int_0^{\omega t} e^{A(\omega t - \tau)} Bu(\tau) d\tau = \int_0^{\omega t} e^{A(\omega t - \tau)} [B_1 \ B_2] \begin{bmatrix} u_1(\tau) \\ u_2(\tau) \end{bmatrix} d\tau = \quad (21)$$

$$\int_0^{\omega t} e^{A(\omega t - \tau)} (B_1 u_1(\tau) + B_2 u_2(\tau)) d\tau =$$

$$(A^2 + I)^{-1} (e^{A\omega t} (I\cos(\phi) + A\sin(\phi)) - I\cos(\omega t + \phi) -$$

$$A\sin(\omega t + \phi))B_1 + A^{-1}(e^{A\omega t} - I)B_2$$

where $\tau$ is a dummy variable and I is a 3×3 identity matrix.

The initial conditions of the states can be determined by applying the continuity conditions of the current through L and the voltages across C and $C_O$ when circuit transitions from the ON state to the OFF state, hence the following equations are obtained $$x_{ON}(0) = x_{OFF}(2\pi(1-D)) \quad (22)$$

$$x_{OFF}(0) = x_{ON}(2\pi D). \quad (23)$$

By evaluating Equations 22 and 23, the initial conditions can be solved for as follows $$\begin{bmatrix} x_{ON}(0) \\ x_{OFF}(0) \end{bmatrix} = \begin{bmatrix} -e^{A_{ON} 2\pi D} & I \\ I & -e^{A_{OFF} 2\pi (1-D)} \end{bmatrix}^{-1} \cdot \begin{bmatrix} x_{fON}(2\pi D) \\ x_{fOFF}(2\pi (1-D)) \end{bmatrix}. \quad (24)$$

The values of D and φ can be numerically solved for by finding the instants at which the voltage across the diode is equal to zero in both ON and OFF intervals, i.e $$x_{2ON}(0) - V_f = 0 \quad (25)$$

$$x_{2OFF}(0) - V_f = 0. \quad (26)$$

Figure 8A:
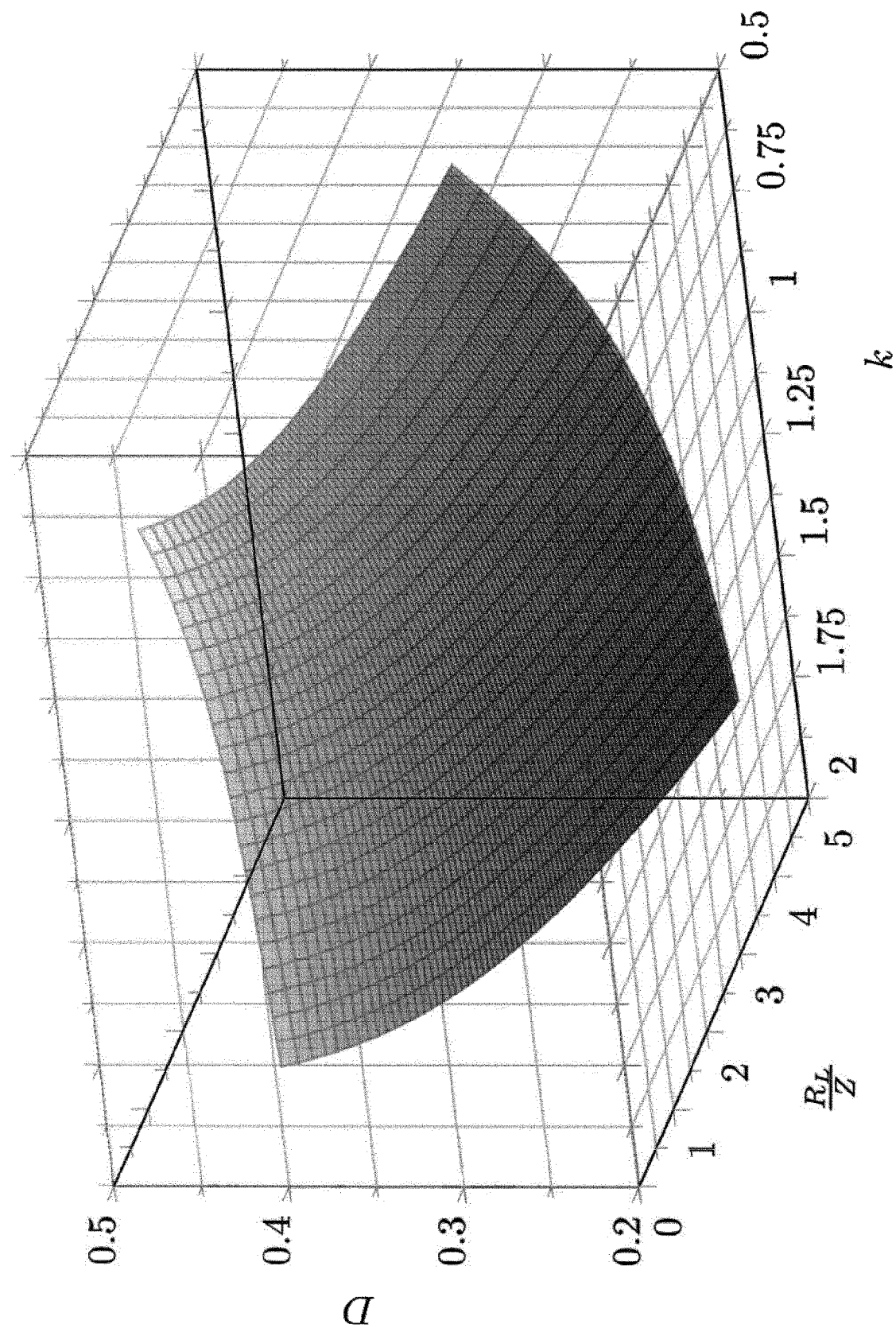
FIGS. 8a and 8b show the solutions for duty cycle D and phase shift $\varphi$ for specific values of normalised load $R_{norm}$ and k.
Figure 8B:
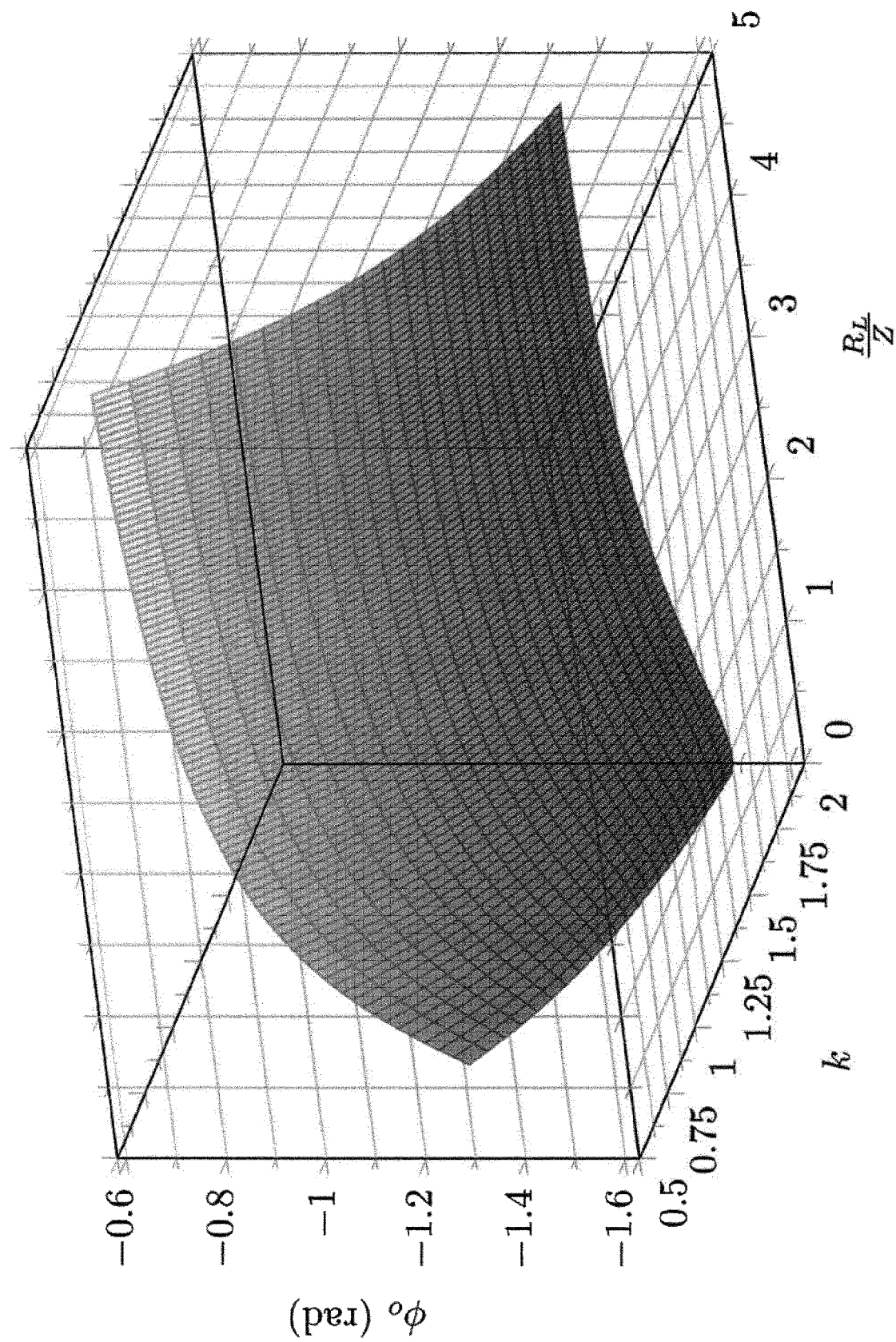

FIGS. 8a and 8b show the solutions for duty cycle D and φ for specific values of normalised load $R_{norm}$ and k.

Figure 9A:
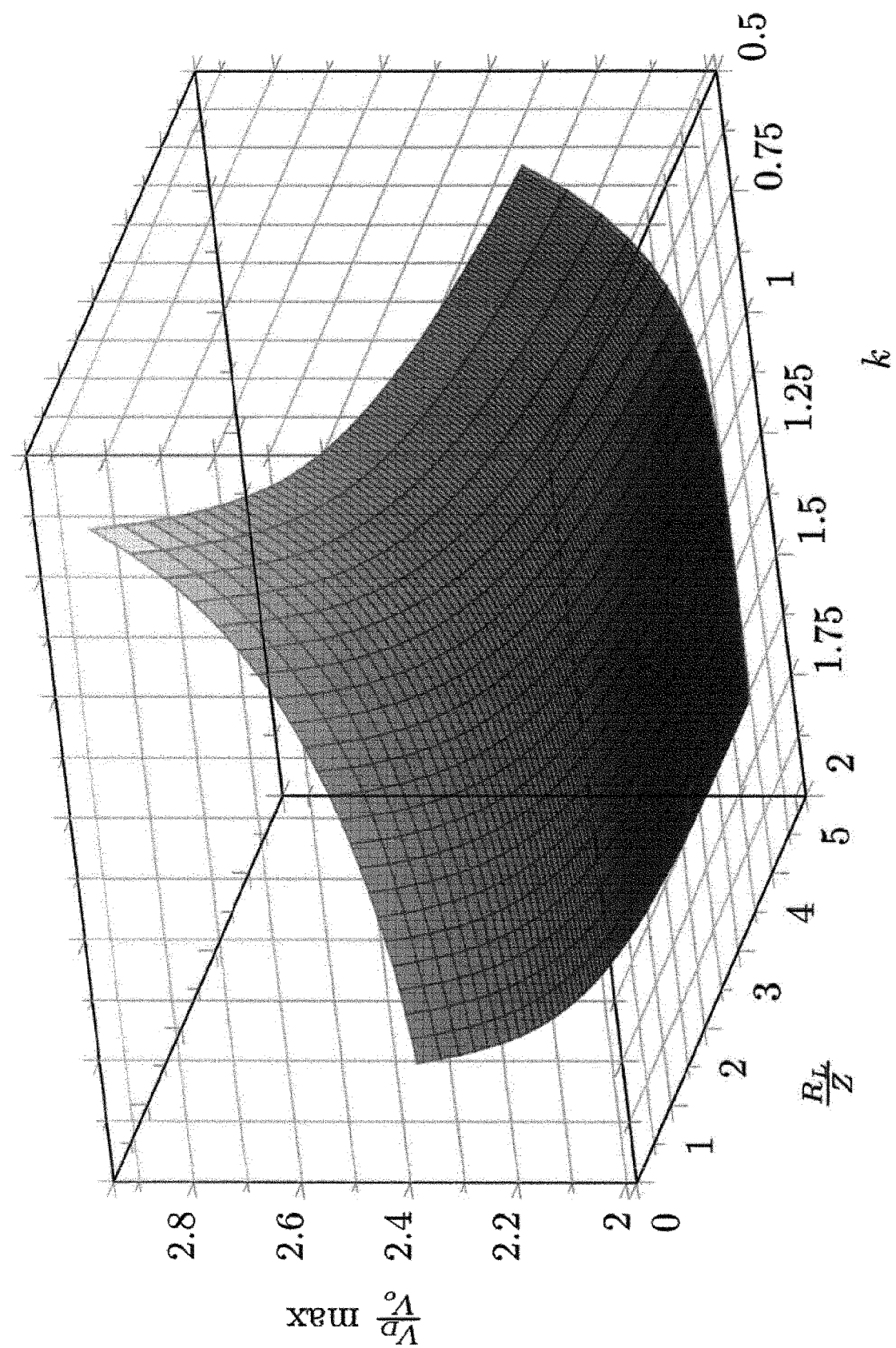
FIGS. 9a and 9b show the maximum diode voltage and current stresses as a function of the normalised load $R_{norm}$ and k.
Figure 9B:
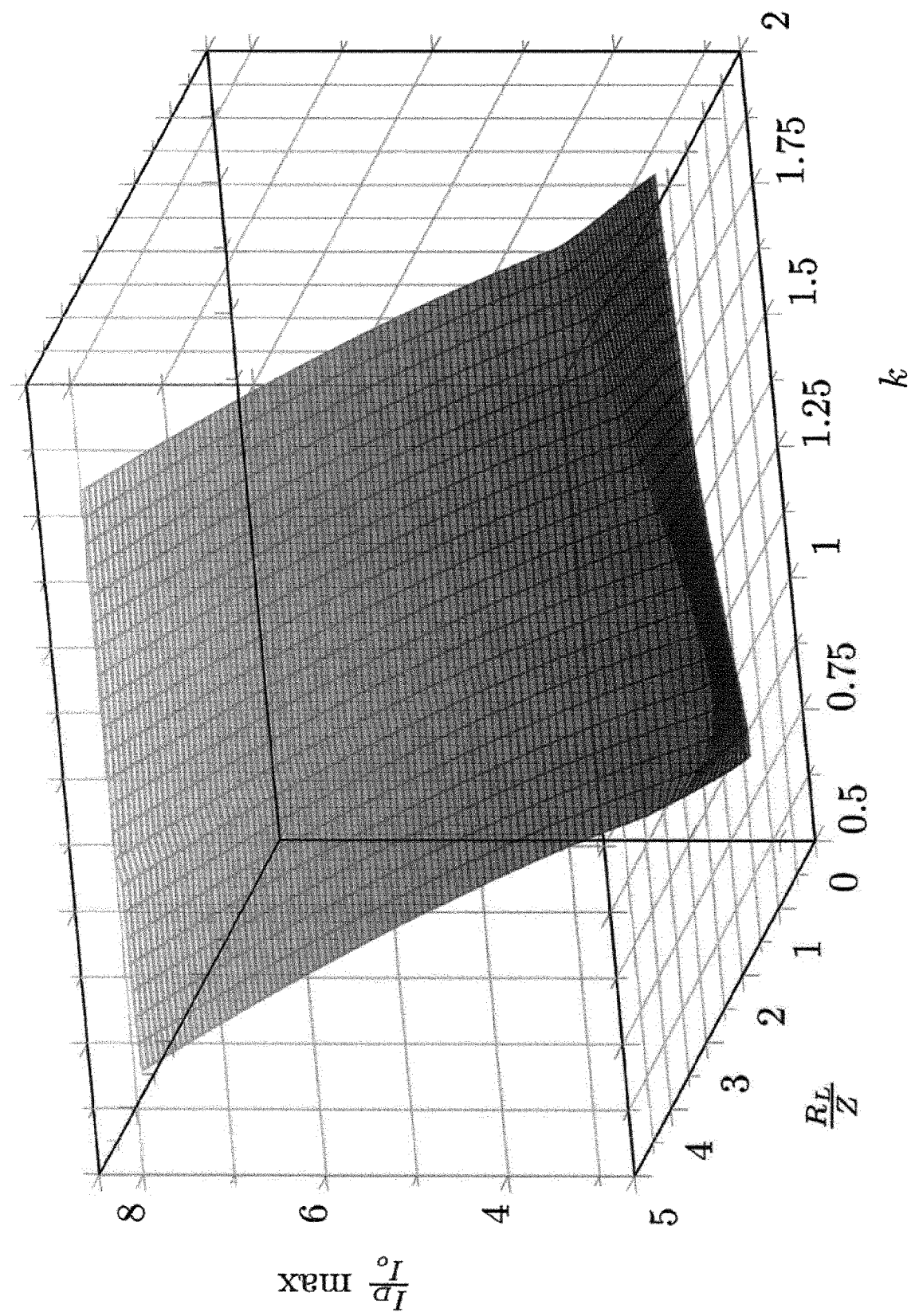

FIGS. 9a and 9b show the maximum diode voltage and current stresses as a function of the normalised load $R_{norm}$ and k.

Figure 10A:
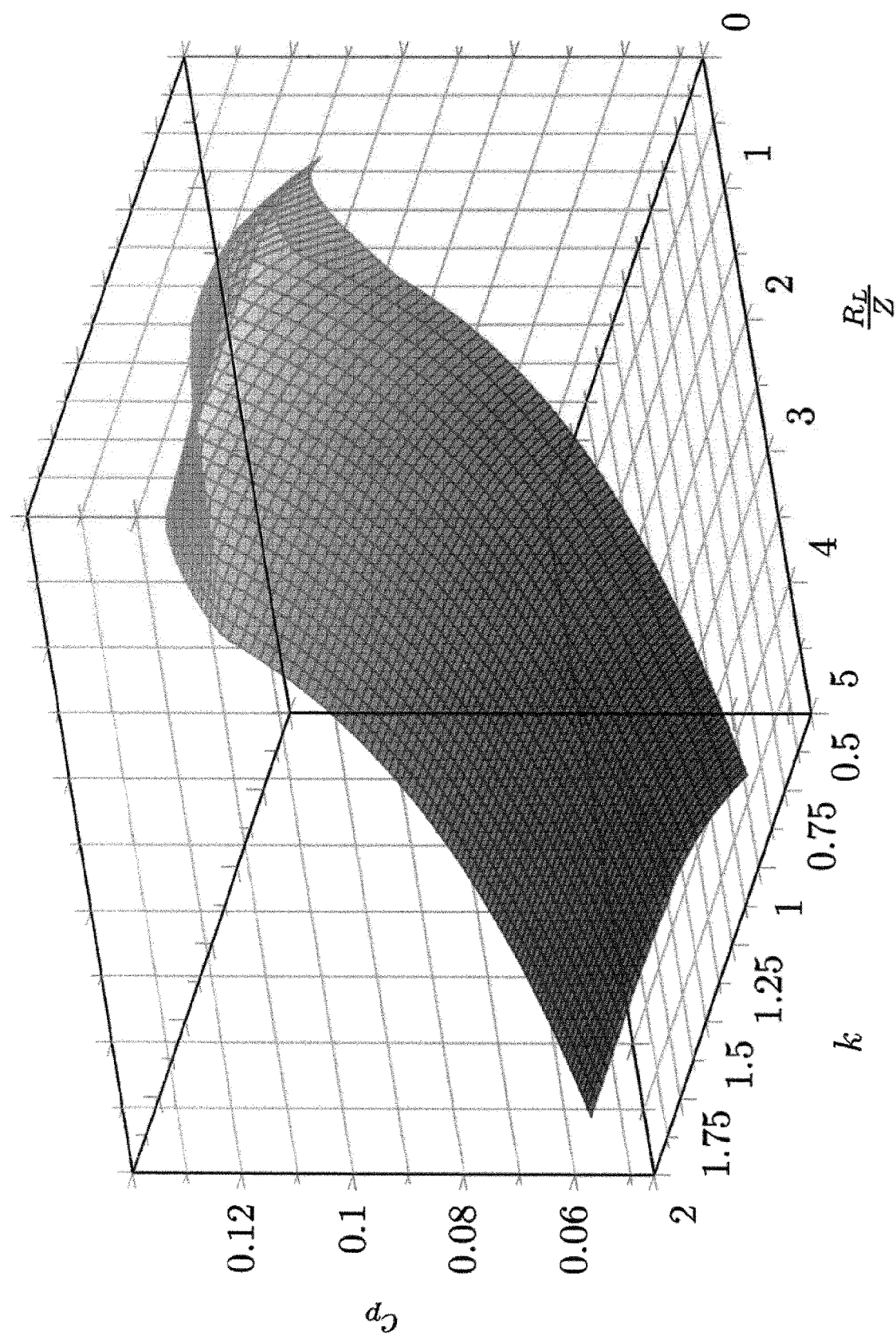
FIGS. 10a - 10d show the power-output capability and normalised output power as a function of the normalised load $R_{norm}$ and k.
Figure 10B:
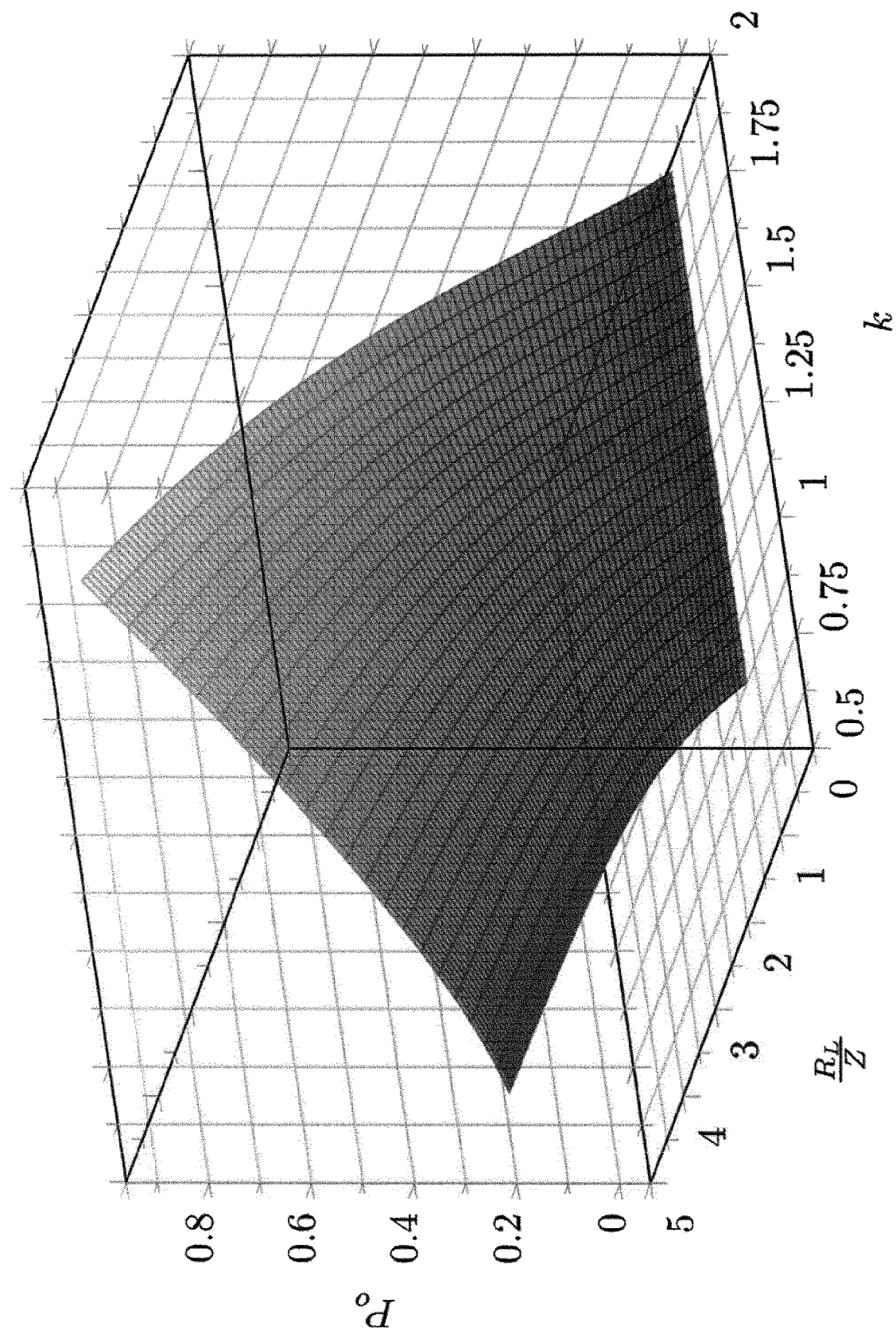

FIGS. 10a and 10b show the power-output capability and normalised output power as a function of the normalised load $R_{norm}$ and k.

Figure 11A:
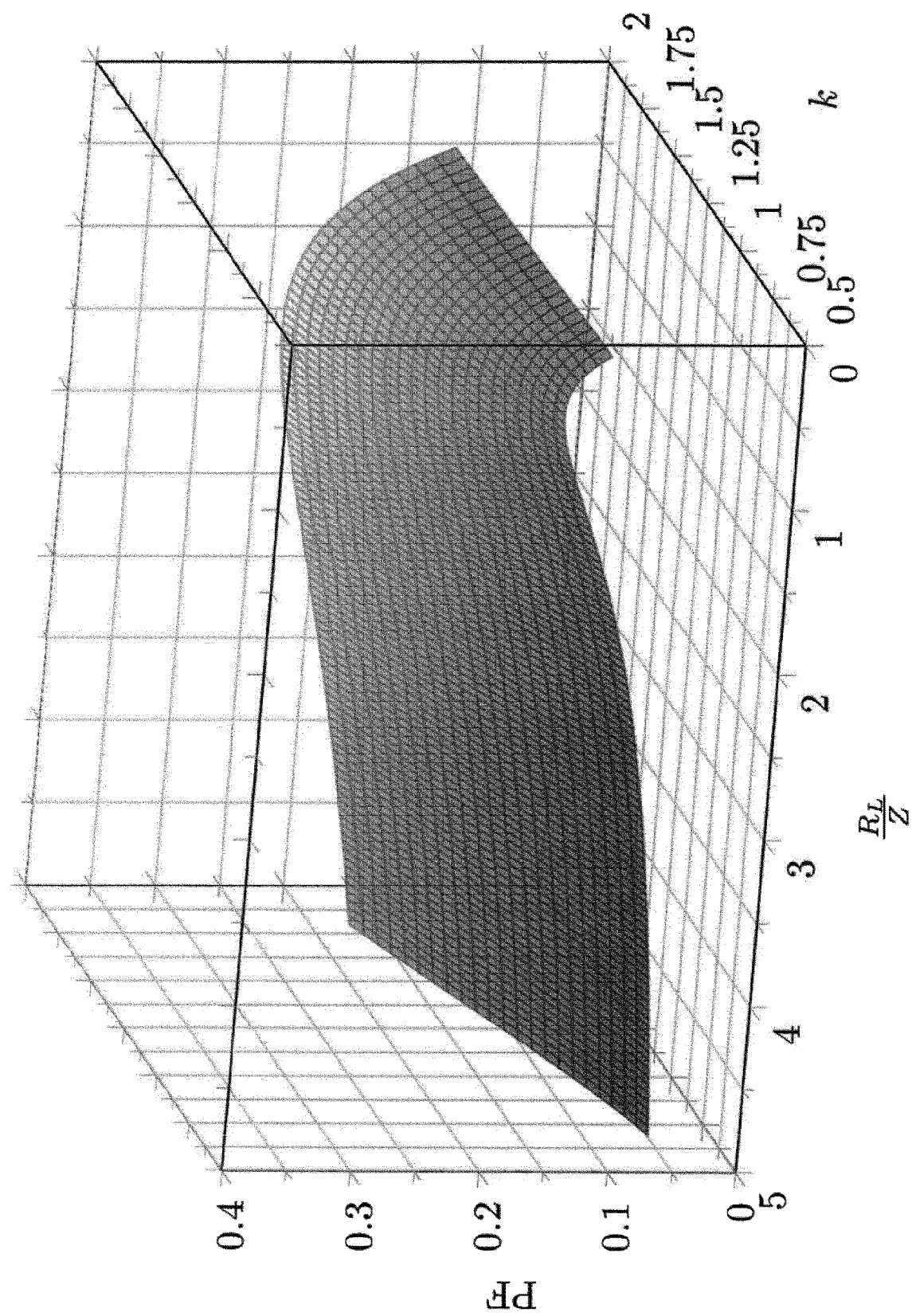
FIGS. 11a and 11b show the power factor and normalised input RMS current as a function of the normalised load $R_{norm}$ and k.
Figure 11B:
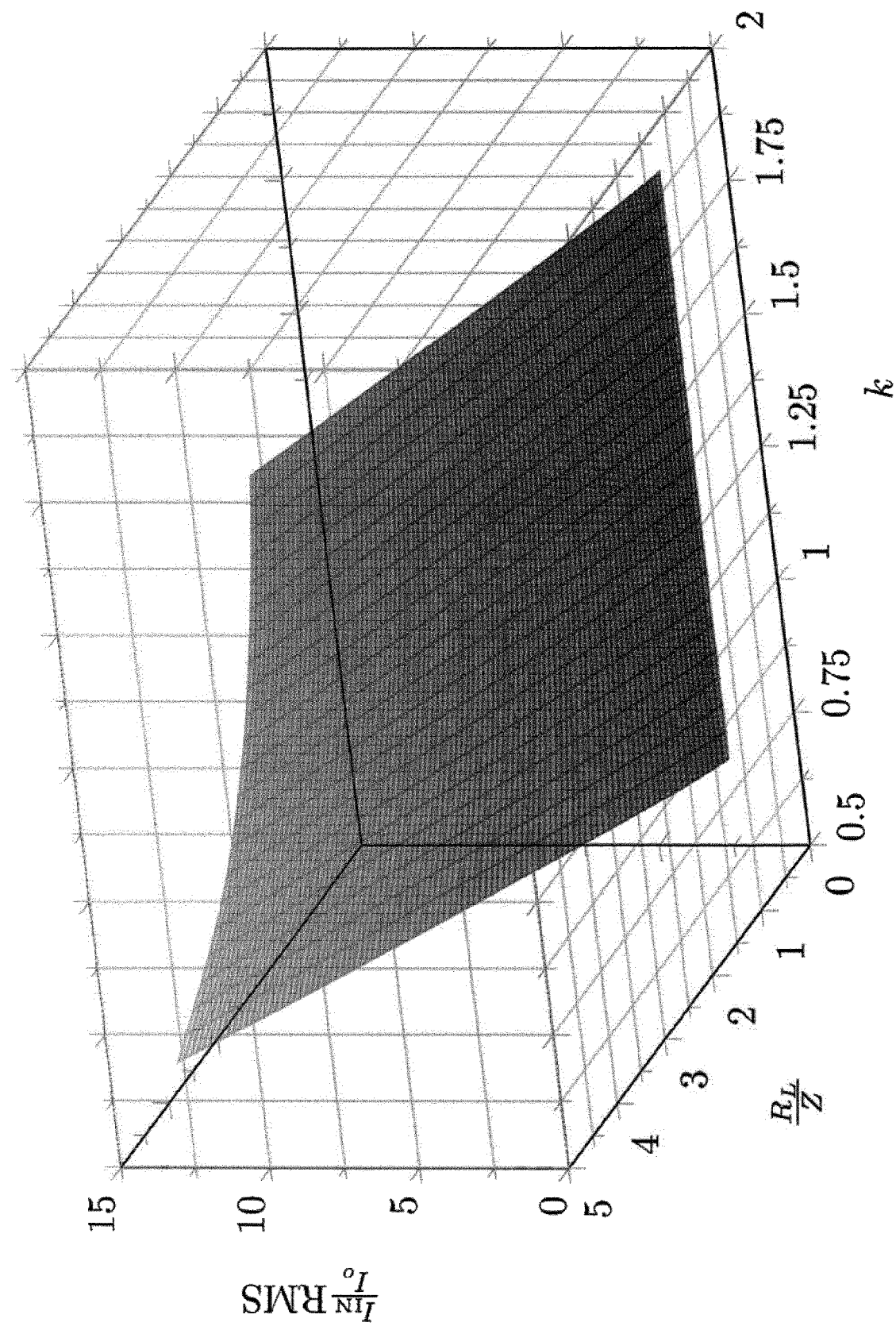

FIGS. 11a and 11b show the power factor and normalised input RMS current as a function of the normalised load $R_{norm}$ and k.

[Maximum Power Capability Case (Case I)]

Figure 12:
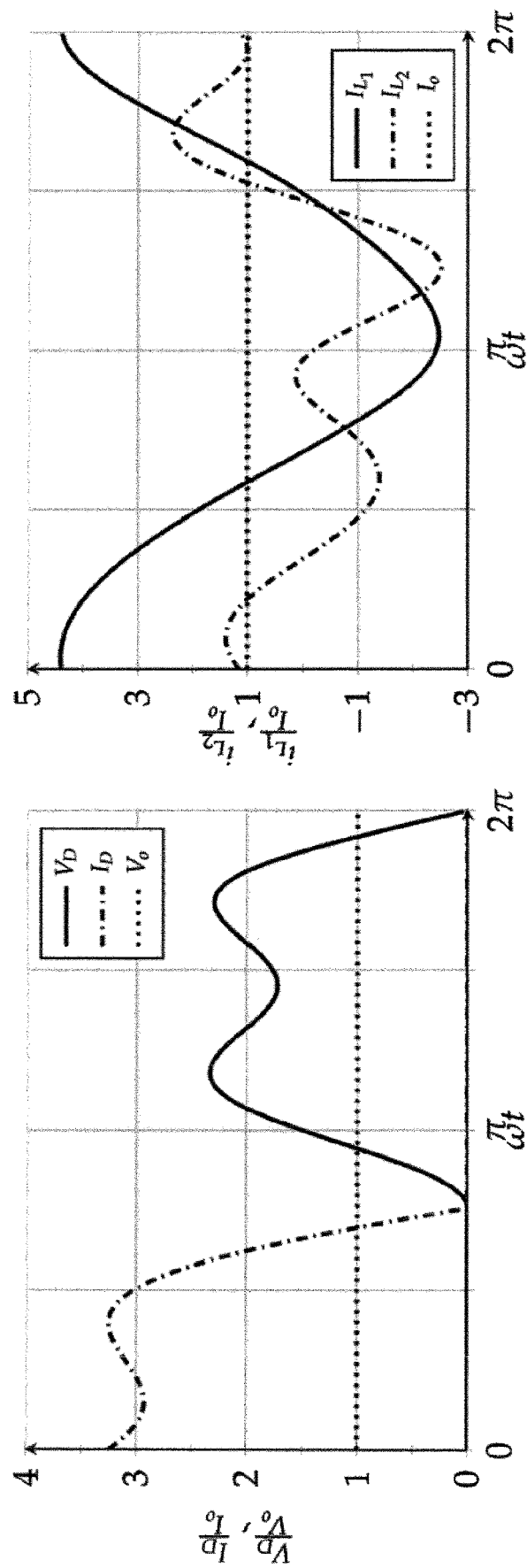
FIG. 12 depicts the voltage and current waveforms for maximum output power capability.
Figure 13:
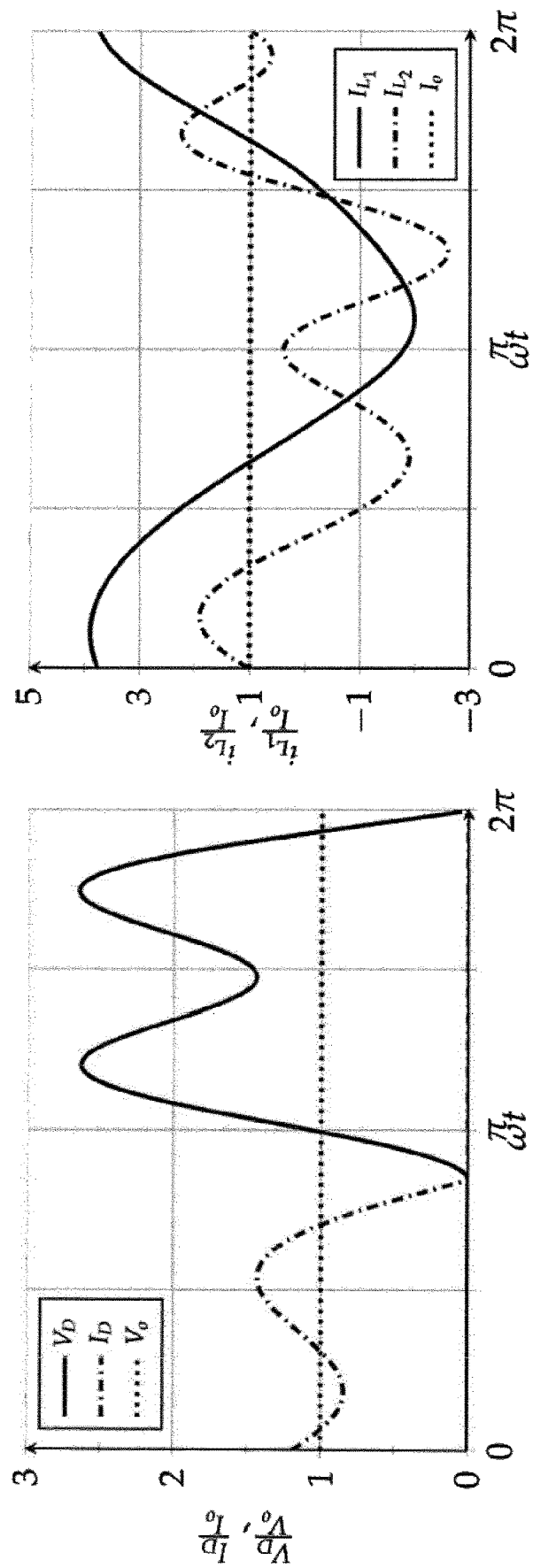
FIG. 13 depicts the voltage and current waveforms for the rectifier operating as a Class E type rectifier.

From FIG. 10a the global maximum power-output capability is 0.1320 which occurs when $R_L/Z=0.840$ and k=0.9672. FIG. 12 shows the voltage and current waveforms associated with this case.

Figure 10C:
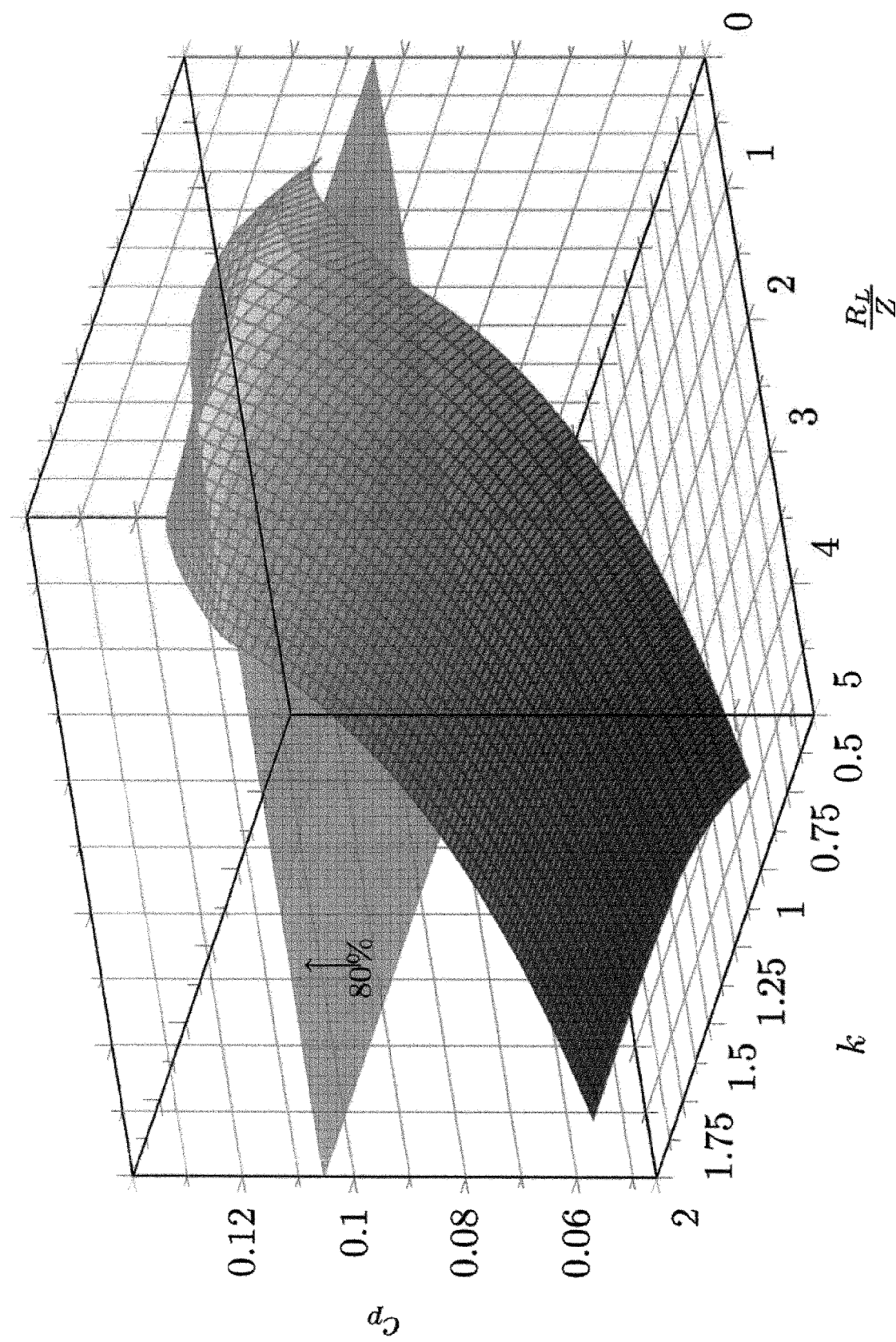

According to FIG. 10c, 80% or above of the maximum power-output capability can be obtained when k lies in the range of greater than equal to 0.70 and less than or equal to 1.50, while $R_L/Z$ is greater than or equal to 0.30 and less than or equal to 3.00.

Figure 10D:
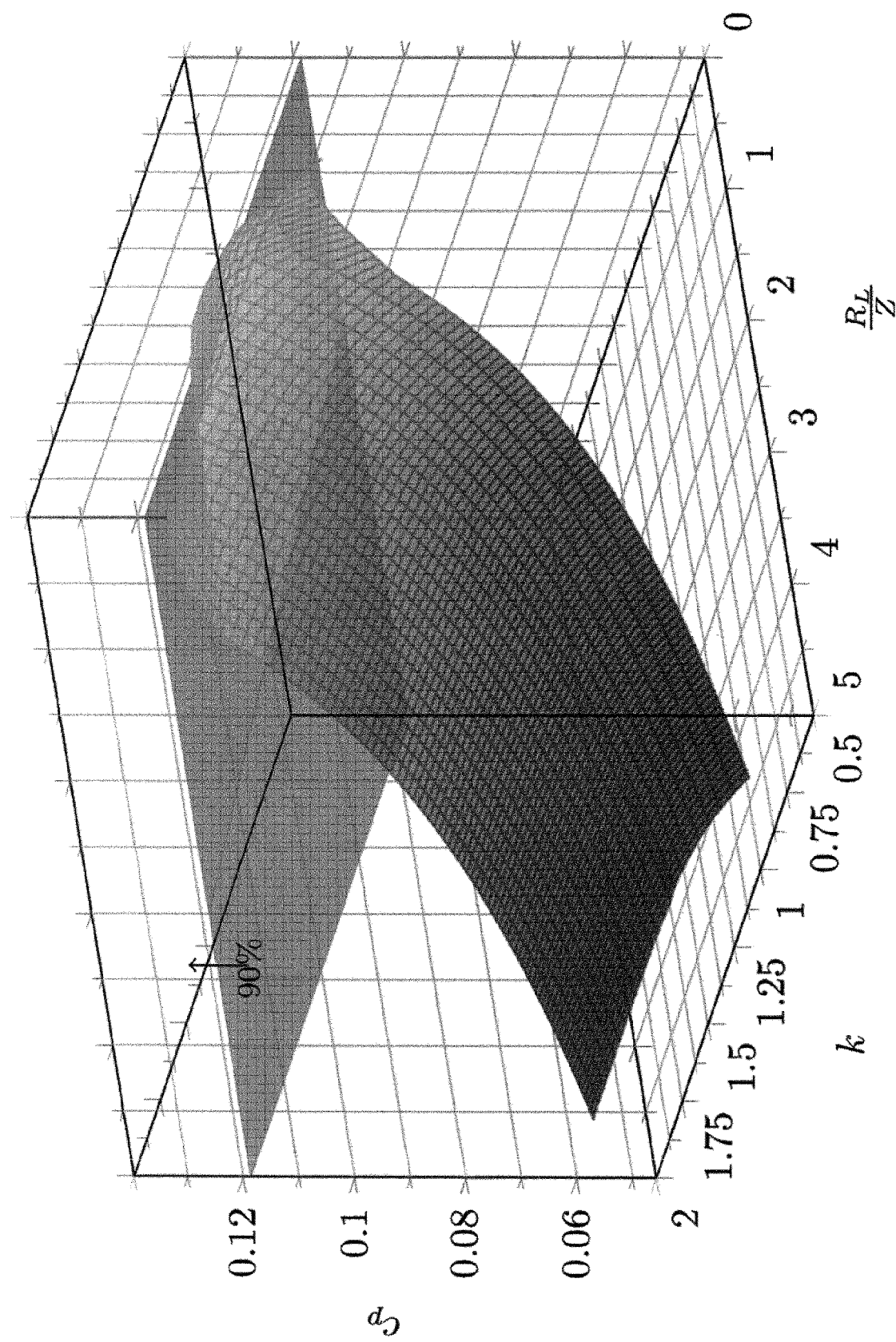

According to FIG. 10d, 90% or above of the maximum power-output capability is obtained when k lies in the range of greater than equal to 0.75 and less than or equal to 1.50 while $R_L/Z$ is greater than or equal to 0.35 and less than or equal to 1.25.

Table 1, below, compares the maximum power-output capability for the new inverter 101 with a voltage-driven Class E type rectifier for a 1000V input voltage at 6.78 MHz. The voltage-driven Class E rectifier is described in British patent application GB 2,505,278 and in 'High-Input-Voltage High-Frequency Class E Rectifiers for Resonant Inductive Links', by Samer Aldhaher, IEEE Transactions on Power Electronics 2015.

TABLE 1

Comparison between the maximum output power capability of the new rectifier and a Class E rectifier

|  | Class EF$_2$ Case I | Class E |
| --- | --- | --- |
| D | 0.378 | 0.5 |
| k | 0.9672 | — |
| $\frac{R_L}{Z}$ | 0.8400 | 0.3884 |
| φ | −69.47° | −70.63° |
| $c_p$ | 0.1320 | 0.1 |
| f | 6.78 MHz | 6.78 MHz |
| $L_1$ | 7.8247 μH | 10 μH |
| $L_2$ | 2.0225 μH | — |
| $C_1$ | 70.4225 pF | 55.1037 pF |
| $C_2$ | 68.1127 pF | — |
| $R_L$ | 280 Ω | 165.5 Ω |
| $V_{IN}$ | 1000 V AC | 1000 V AC |
| $V_D$ max | 783.07 V | 940.60 V |
| $I_D$ max | 4.02 A | 4.37 A |
| $P_o$ | 413 W | 409 W |
| $I_{IN}$ RMS | 3.128 A | 2.672 A |
| $I_o$ | 1.21 A | 1.57 A |

From Table 1, it can be seen that the new rectifier 101, configure to operate in this manner, has a lower voltage and current stress on the diode, and inductance $L_1$ is about 22% smaller than the Class E rectifier for the same output power level. Lower voltage and current stresses on the diode means reduced losses and cost, and a lower $L_1$ inductance results in a smaller and more efficient inductance. The circulating DC current is lower than that of the Class E rectifier for the same output power level which means the inductor $L_1$ is less likely to saturate, in addition to a lower intensity DC magnetic field emitted by the electromagnetic signal receiving element 1013 of the wireless power transfer system. Also, the value of capacitor $C_1$ is about 40% larger than that of the Class E rectifier, this means the rectifier 101 can operate at a higher switching frequency than the Class E rectifier. The rectifier 101 in this case has a higher input RMS current and a lower power factor than the Class E rectifier.

['Class E' equivalent output (Case II)]

For a given load, the output power and voltage of the new rectifier 101 will be equivalent to the voltage-driven Class E rectifier output when $R_L/Z=0.6$ and k=0.7.

In such a case, the new rectifier 101 could be a replacement for the Class E rectifier. In other words for a given Class E rectifier circuit that has been implemented and installed in a certain wireless power transfer system, a new rectifier 101 based on this case can be implemented to replace the Class E rectifier circuit. Tuning of the wireless power transfer system might be affected though.

Table 2, below, compares the new rectifier 101 configured to operate in the equivalent output mode with the voltage-driven Class E rectifier for a 1000V input voltage at 6.78 MHz with a load of 165.5Ω.

|  | Class EF$_2$ Case II | Class E |
| --- | --- | --- |
| D | 0.422 | 0.5 |
| k | 0.700 | — |
| $\frac{R_L}{Z}$ | 0.6000 | 0.3884 |
| φ | −63.02° | −70.63° |
| $c_p$ | 0.1144 | 0.1 |
| f | 6.78 MHz | 6.78 MHz |
| $L_1$ | 6.4733 μH | 10 μH |

-continued

|  | Class EF$_2$ Case II | Class E |
| --- | --- | --- |
| L$_2$ | 1.1328 µH | — |
| C$_1$ | 85.1242 pF | 55.1037 pF |
| C$_2$ | 121.6060 pF | — |
| R$_L$ | 165.5 Ω | 165.5 Ω |
| V$_{IN}$ | 1000 V AC | 1000 V AC |
| V$_D$ max | 688.22 V | 940.60 V |
| I$_D$ max | 5.2 A | 4.37 A |
| P$_o$ | 409 W | 409 W |
| I$_{IN}$ RMS | 3.621 A | 2.672 A |
| I$_o$ | 1.57 A | 1.57 A |

From Table 2, it can be seen the new rectifier 101, configured to operate in this manner, has a 25% lower voltage stress, and a 20% increase in current stress. Inductance L$_1$ is about 35% smaller than the Class E rectifier. A lower L$_1$ inductance results in a smaller and more efficient inductance. The value of capacitor C$_1$ in the rectifier 101 is about 55% larger than that of the Class E rectifier, this means that the rectifier 101 can operate at a higher switching frequency than the Class E rectifier. The rectifier 101 in this case has a higher input RMS current and a lower power factor than the Class E rectifier.

[Operation at High k Values—Steady State Operation (Case III)]

Figure 14:
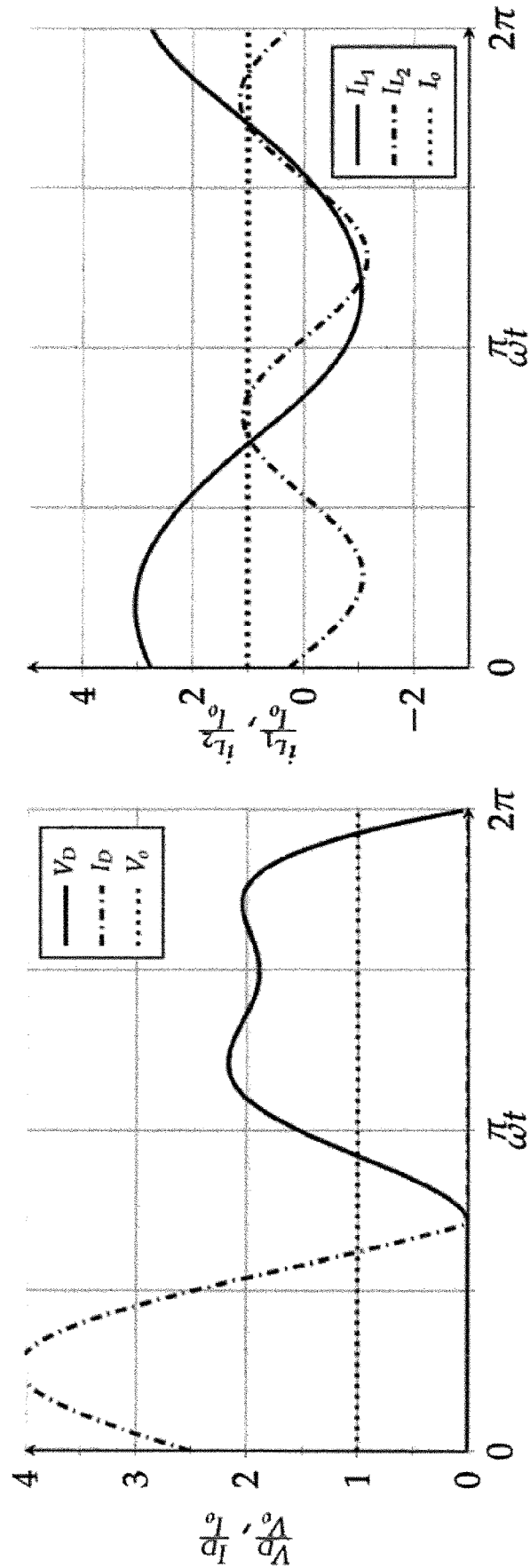
FIG. 14 depicts the voltage and current waveforms for steady state operation.

When k increases to values greater than or equal to 20, the current in the second tank circuit 1012 becomes sinusoidal. FIG. 14 shows the voltage and current waveforms for this case.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A rectifier for wireless power transfer, the rectifier comprising:
an electromagnetic signal receiving element operable to be driven with an electromagnetic signal oscillating at a first frequency;
a first tank circuit comprising a first inductor and a first capacitance in series;
a second tank circuit in parallel with the electromagnetic signal receiving element, the second tank circuit comprising a second inductor and a second capacitance in series;
a third capacitance in parallel with the electromagnetic signal receiving element; and
a rectifying element in parallel with the first capacitance; wherein:
the first inductor is in series with the electromagnetic signal receiving element between the electromagnetic signal receiving element and the second tank circuit,
the first capacitance is between the second tank circuit and the third capacitance, and
the second inductor and the second capacitance are selected such that the resonant frequency of the second tank circuit is an integer multiple, greater than one, of the first frequency.

2. The rectifier according to claim 1, further comprising:
a fourth capacitance in parallel with the electromagnetic signal receiving element, wherein:
the fourth capacitance is chosen such that the resonant frequency of the electromagnetic signal receiving element and the fourth capacitance is equal to the first frequency, and
the first inductor is between the fourth capacitance and the second tank circuit.

3. The rectifier according to claim 1, further comprising:
a fourth capacitance in parallel with the electromagnetic signal receiving element, wherein:
the fourth capacitance is chosen such that the resonant frequency of the electromagnetic signal receiving element and the fourth capacitance differs from the first frequency, and
the first inductor is between the fourth capacitance and the second tank circuit.

4. The rectifier according to claim 3, wherein the ratio of the first frequency to the resonant frequency of the electromagnetic signal receiving element and the fourth capacitance is in the range 0.2 to 3.0.

5. A wireless power transfer receiver comprising:
a rectifier according to claim 1; and
a load connected in parallel with the electromagnetic signal receiving element.

6. The wireless power transfer receiver according to claim 5, wherein:
the second inductor and the second capacitance are selected such that the resonant frequency of the second tank circuit is double the first frequency,
the ratio of the first capacitance to the second capacitance is greater than or equal to 0.70 and less than or equal to 1.50, and
the ratio of the resistance of the load to the characteristic impedance of the first tank circuit is greater than or equal to 0.30 and less than or equal to 3.00.

7. The wireless power transfer receiver according to claim 6, wherein:
the ratio of the first capacitance to the second capacitance is greater than or equal to 0.75 and less than or equal to 1.50, and
the ratio of the resistance of the load to the characteristic impedance of the first tank circuit is greater than or equal to 0.35 and less than or equal to 1.25.

8. The wireless power transfer receiver according to claim 7, wherein:
the ratio of the first capacitance to the second capacitance is greater than or equal to 0.9 and less than or equal to 1.0, and
the ratio of the resistance of the load to the characteristic impedance of the first tank circuit is greater than or equal to 0.8 and less than or equal to 0.9.

9. The wireless power transfer receiver according to claim 8, wherein:
the ratio of the first capacitance to the second capacitance is 0.967, and
the ratio of the resistance of the load to the characteristic impedance of the first tank circuit is 0.840.

10. The wireless power transfer receiver according to claim 5, wherein:
the second inductor and the second capacitance are selected such that the resonant frequency of the second tank circuit is double the first frequency,
the ratio of the first capacitance to the second capacitance is greater than or equal to 0.65 and less than or equal to 0.75, and
the ratio of the resistance of the load to the characteristic impedance of the first tank circuit is greater than or equal to 0.55 and less than or equal to 0.65.

11. The wireless power transfer receiver according to claim 10, wherein:
the ratio of the first capacitance to the second capacitance is 0.7, and
the ratio of the resistance of the load to the characteristic impedance of the first tank circuit is 0.6.

12. The wireless power transfer receiver according to claim 5, wherein:
the second inductor and the second capacitance are selected such that the resonant frequency of the second tank circuit is double the first frequency,
the ratio of the first capacitance to the second capacitance is greater than or equal to 20.

13. A wireless power transfer system comprising:
a wireless power transfer transmitter comprising a electromagnetic signal transmitting element; and
a wireless power transfer receiver according to claim 5.

14. A method for wireless power transfer, comprising:
providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.70 and less than or equal to 1.50;
connecting a load with a resistance such that the ratio of the resistance of the load to the characteristic impedance of the first tank circuit is greater than or equal to 0.30 and less than or equal to 3.00; and
driving the electromagnetic signal receiving element with an electromagnetic signal oscillating at the first frequency.

15. The method according to claim 14, wherein:
the ratio of the first capacitance to the second capacitance is greater than or equal to 0.75 and less than or equal to 1.50, and
the ratio of the resistance of the load to the characteristic impedance of the first tank circuit is greater than or equal to 0.35 and less than or equal to 1.25.

16. The method according to claim 15, wherein:
the ratio of the first capacitance to the second capacitance is greater than or equal to 0.9 and less than or equal to 1.0, and
the ratio of the resistance of the load to the characteristic impedance of the first tank circuit is greater than or equal to 0.8 and less than or equal to 0.9.

17. The method according to claim 16, wherein:
the ratio of the first capacitance to the second capacitance is 0.967, and
the ratio of the resistance of the load to the characteristic impedance of the first tank circuit is 0.840.

18. A method for wireless power transfer, comprising:
providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 0.65 and less than or equal to 0.75;
connecting a load with a resistance such that the ratio of the resistance of the load to the characteristic impedance of the first tank circuit is greater than or equal to 0.55 and less than or equal to 0.65; and
driving the electromagnetic signal receiving element with an electromagnetic signal oscillating at the first frequency.

19. The method according to claim 18, wherein:
the ratio of the first capacitance to the second capacitance is 0.7, and
the ratio of the resistance of the load to the characteristic impedance of the first tank circuit is 0.6.

20. A method for wireless power transfer, comprising:
providing a rectifier comprising an electromagnetic signal receiving element operable to be driven with an electromagnetic signal oscillating at a first frequency; a first tank circuit comprising a first inductor and a first capacitance in series; a second tank circuit in parallel with the electromagnetic signal receiving element, the second tank circuit comprising a second inductor and a second capacitance in series; a third capacitance in parallel with the electromagnetic signal receiving element; and a rectifying element in parallel with the first capacitance, wherein the first inductor is in series with the electromagnetic signal receiving element between the electromagnetic signal receiving element and the second tank circuit, the first capacitance is between the second tank circuit and the third capacitance, the second inductor and the second capacitance are selected such that the resonant frequency of the second tank circuit is double the first frequency and wherein the ratio of the first capacitance to the second capacitance is greater than or equal to 20;
connecting a load; and
driving the electromagnetic signal receiving element with an electromagnetic signal oscillating at the first frequency.

* * * * *